US012772275B2

(12) United States Patent
Tu et al.

(10) Patent No.: US 12,772,275 B2
(45) Date of Patent: Oct. 20, 2026

(54) PHYSICAL DOWNLINK CONTROL CHANNEL (PDCCH) DETERMINATION USING CONTROL RESOURCE SETS (CORESET)

(71) Applicant: HUAWEI TECHNOLOGIES CO., LTD., Shenzhen (CN)

(72) Inventors: Jing Tu, Chengdu (CN); Long Yu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 18/598,175

(22) Filed: Mar. 7, 2024

(65) Prior Publication Data

US 2024/0215058 A1 Jun. 27, 2024

Related U.S. Application Data

(63) Continuation of application No. PCT/CN2022/117645, filed on Sep. 7, 2022.

(30) Foreign Application Priority Data

Sep. 9, 2021 (CN) ......................... 202111057895.9

(51) Int. Cl.
*H04W 72/52* (2023.01)
*H04L 5/00* (2006.01)
*H04W 72/232* (2023.01)

(52) U.S. Cl.
CPC ........... *H04W 72/52* (2023.01); *H04L 5/0053* (2013.01); *H04L 5/0096* (2013.01); *H04W 72/232* (2023.01)

(58) Field of Classification Search
CPC ............... H04W 72/52; H04W 72/232; H04W 72/044; H04W 72/0446; H04W 72/0453;
(Continued)

(56) References Cited

U.S. PATENT DOCUMENTS

2013/0107816 A1 5/2013 Iraji et al.
2019/0045490 A1 2/2019 Davydov et al.
(Continued)

FOREIGN PATENT DOCUMENTS

CN 103428876 A 12/2013
CN 104144503 A 11/2014
(Continued)

OTHER PUBLICATIONS

3GPP TSG-RAN WG2 Meeting #78, Prague, Czech Republic, May 21-25, 2012, R2-122699, "PUCCH analysis for EDDA," Nokia Siemens Networks et al.; 4 total pages.

*Primary Examiner* — Rushil P. Sampat
(74) *Attorney, Agent, or Firm* — Rimon PC

(57) ABSTRACT

A communication resource determining method and apparatus are provided, so that a resource for communicating a physical downlink control channel between an access network device and a terminal device is adapted to a cell load when the cell load changes. The method in this application may include the access network device determining first indication information based on load information of a cell, and sending the first indication information to the terminal device. The terminal device determines, based on the first indication information and first information, a first resource used by the terminal device to detect the physical downlink control channel. The first information includes a plurality of pieces of resource information. The first indication information corresponds to first resource information in the plurality of pieces of resource information, and the first resource information indicates the first resource.

17 Claims, 9 Drawing Sheets

(58) Field of Classification Search
CPC ............. H04W 72/1289; H04W 72/23; H04W 72/231; H04L 5/0053; H04L 5/0096; H04L 5/0048; H04L 5/0094
See application file for complete search history.

(56) References Cited

U.S. PATENT DOCUMENTS

| | | | | |
|---|---|---|---|---|
| 2020/0154475 | A1 | 5/2020 | Pao et al. | |
| 2021/0266920 | A1 | 8/2021 | Yan | |
| 2021/0345342 | A1* | 11/2021 | Sakhnini | H04W 72/23 |
| 2022/0312380 | A1* | 9/2022 | Chen | H04W 72/02 |
| 2022/0312381 | A1* | 9/2022 | Chen | H04L 5/0053 |
| 2022/0416980 | A1* | 12/2022 | He | H04W 72/23 |
| 2022/0417904 | A1* | 12/2022 | Kwak | H04W 56/001 |
| 2023/0054454 | A1* | 2/2023 | Wei | H04L 5/0053 |
| 2025/0089060 | A1* | 3/2025 | Li | H04B 7/06968 |

FOREIGN PATENT DOCUMENTS

| | | | |
|---|---|---|---|
| CN | 105589506 | A | 5/2016 |
| JP | 2020532892 | A | 11/2020 |
| WO | 2011136082 | A1 | 11/2011 |
| WO | 2021010786 | A1 | 1/2021 |
| WO | WO 2021168814 | A1 * | 9/2021 |

* cited by examiner

PHYSICAL DOWNLINK CONTROL CHANNEL (PDCCH) DETERMINATION USING CONTROL RESOURCE SETS (CORESET)

CROSS-REFERENCE TO RELATED APPLICATIONS

This application is a continuation of International Application No. PCT/CN2022/117645, filed on Sep. 7, 2022, which claims priority to Chinese Patent Application No. 202111057895.9, filed on Sep. 9, 2021. The disclosures of the aforementioned applications are incorporated herein by reference in these entireties.

TECHNICAL FIELD

This application relates to the field of communication technologies, and in particular, to a communication resource determining method and a communication apparatus.

BACKGROUND

In a new radio (NR) system, an access network device may encapsulate, in a control resource set (CORESET), information such as a frequency band occupied by a physical downlink control channel (PDCCH) in frequency domain and a quantity of orthogonal frequency division multiplexing (OFDM) symbols occupied in time domain. The access network device may encapsulate, in a search space (SS), information such as a start symbol number of the physical downlink control channel and a monitoring periodicity of the physical downlink control channel. The access network device may then send the CORESET and the SS to a terminal device via radio resource control (RRC) signaling. The terminal device may determine a resource based on the CORESET and the SS that are sent by the access network device, and detect the physical downlink control channel on the determined resource.

When the access network device determines that cell load changes, the access network device may change the CORESET and the SS depending on the change of the cell load, and then configure a changed CORESET and changed SS for the terminal device in an RRC signaling-based reconfiguration process, so that the terminal device may determine, based on the changed CORESET and the changed SS, a changed resource of the physical downlink control channel, and detect the physical downlink control channel on the resource.

However, the RRC signaling-based reconfiguration process is time-consuming. For example, after several or dozens of transmission time intervals (TTIs), the access network device can successfully configure the changed CORESET and the changed SS for the terminal device. In this case, the access network device cannot reconfigure the CORESET and the SS for the terminal device in a timely manner based on the change of the cell load. Consequently, a resource for communicating the physical downlink control channel between the access network device and the terminal device is not adapted to the cell load.

SUMMARY

This application provides a communication resource determining method and a communication apparatus, to help implement that a resource for communicating a physical downlink control channel between an access network device and a terminal device is adapted to a cell load when the cell load changes.

According to a first aspect, this application provides a communication resource determining method. The communication resource determining method may be performed by a terminal device or a module (for example, a chip) in the terminal device. The following uses an example in which the method is performed by the terminal device for description.

In a possible implementation, the communication resource determining method includes: The terminal device receives first indication information from an access network device, where the first indication information is associated with load information of a cell to which the terminal device belongs. The terminal device determines, based on the first indication information and first information, a first resource used by the terminal device to detect a physical downlink control channel, where the first information includes a plurality of pieces of resource information, the first indication information corresponds to first resource information in the plurality of pieces of resource information, and the first resource information indicates the first resource. In a possible implementation, the first information further includes a plurality of pieces of indication information, the plurality of pieces of indication information respectively correspond to the plurality of pieces of resource information, and the plurality of pieces of indication information include the first indication information.

In the foregoing technical solution, the access network device may determine the first indication information based on the load information of the cell, and send the first indication information to the terminal device. Correspondingly, the terminal device may determine the first resource based on the first indication information and the first information, and detect the physical downlink control channel on the first resource. When the load information of the cell changes, the access network device does not need to reconfigure configuration information of the physical downlink control channel for the terminal device. This helps increase a speed at which the access network device indicates, to the terminal device, a resource for communicating the physical downlink control channel. In addition, the resource that is determined by the terminal device and that is for communicating the physical downlink control channel is adapted to the load information of the cell to which the terminal device belongs.

In a possible implementation, sizes of resources used by the terminal device to detect the physical downlink control channel and indicated by different resource information in the first information are different. For example, at least one of the following indicated by different resource information in the first information is different: a quantity of symbols or a bandwidth of a resource used by the terminal device to detect the physical downlink control channel.

In the foregoing technical solution, the terminal device may determine the resources of different sizes based on different indication information from the access network device. This allows the terminal device to determine, in cases of different load information of the cell to which the terminal device belongs, transmission resources of sizes (or capacities) corresponding to the load information of the cell.

In a possible implementation, the indication information in the first information is bandwidth part information, the first indication information is first bandwidth part information, and the first bandwidth part information further indicates for the terminal device to switch an operating bandwidth to a bandwidth part corresponding to the first bandwidth part information.

In the foregoing technical solution, the access network device configures a plurality of different bandwidth parts for the terminal device, and resource information corresponding to each bandwidth part may be independently configured, that is, each bandwidth part may correspond to a quantity of symbols and/or a frequency domain bandwidth. The access network device may indicate corresponding resource information to the terminal device in a manner of scheduling the terminal device to switch the operating bandwidth. When the cell load changes, the access network device may quickly and efficiently indicate, to the terminal device, the first bandwidth part information corresponding to a changed cell load. This helps ensure that the resource for communicating the physical downlink control channel between the access network device and the terminal device is adapted to the cell load. Further, the first bandwidth part information may be sent by the access network device to the terminal device via downlink control information (DCI), and the first bandwidth part information may be for implementing configuration of a TTI granularity.

In a possible implementation, the plurality of pieces of resource information further include second resource information, the second resource information indicates a second resource, and the second resource includes the first resource. In a possible implementation, a resource other than the first resource in the second resource may be used by the terminal device to receive a physical downlink shared channel, and a location of the physical downlink shared channel may be indicated by rate matching pattern information on the physical downlink control channel in the first resource.

In the foregoing technical solution, the access network device may set, for the terminal device, rate matching patterns corresponding to a plurality of pieces of rate matching pattern information. In this way, each rate matching pattern may indicate a different location of the physical downlink shared channel. The access network device may indicate the location of the physical downlink shared channel to the terminal device in a manner of including the rate matching pattern information in the physical downlink control channel. This helps improve resource utilization.

In a possible implementation, the communication resource determining method further includes: The terminal device receives the first information from the access network device via RRC signaling.

According to a second aspect, this application provides a communication resource determining method. The communication resource determining method may be performed by an access network device or a module (for example, a chip) in the access network device. The following uses an example in which the method is performed by the access network device for description.

In a possible implementation, the communication resource determining method includes: The access network device sends first indication information to a terminal device, where the first indication information is associated with load information of a cell of the access network device. The access network device determines, based on the first indication information and first information, a first resource used by the access network device to send a physical downlink control channel, where the first information includes a plurality of pieces of resource information, the first indication information corresponds to first resource information in the plurality of pieces of resource information, and the first resource information indicates the first resource. In a possible implementation, the first information further includes a plurality of pieces of indication information, the plurality of pieces of indication information respectively correspond to the plurality of pieces of resource information, and the plurality of pieces of indication information include the first indication information.

In a possible implementation, sizes of resources used by the access network device to send the physical downlink control channel and indicated by different resource information in the first information are different. For example, at least one of the following indicated by different resource information in the first information is different: a quantity of symbols or a bandwidth of resources used by the access network device to send the physical downlink control channel.

In a possible implementation, the first indication information is first bandwidth part information, and the first bandwidth part information is further used by the access network device to schedule an operating bandwidth of the terminal device to be switched to a bandwidth part corresponding to the first bandwidth part information.

In a possible implementation, the plurality of pieces of resource information further include second resource information, the second resource information indicates a second resource, and the second resource includes the first resource. In a possible implementation, a resource other than the first resource in the second resource is used by the access network device to send a physical downlink shared channel, and a location of the physical downlink shared channel may be indicated by rate matching pattern information on the physical downlink control channel in the first resource.

In a possible implementation, the method further includes: The access network device determines the first indication information based on the load information of the cell and the first information. In a possible implementation, the access network device determines, based on the load information of the cell, a size of the first resource for sending the physical downlink control channel; and determines the first indication information based on the size of the first resource and the first information.

In a possible implementation, the communication resource determining method further includes: The access network device selects, according to a preset policy, the terminal device from terminal devices served by the cell. In a possible implementation, the preset policy may be a random selection policy, or may be selection based on signal strength. When the access network device selects, based on the signal strength, the terminal device from the terminal devices served by the cell, the access network device may determine signal strength of each of a plurality of terminal devices served by the cell, and select a terminal device whose signal strength meets a preset condition.

In a possible implementation, the communication resource determining method further includes: The access network device sends the first information to the terminal device via RRC signaling.

For technical effects that can be achieved in any possible implementation of the second aspect, refer to descriptions of beneficial effects in the first aspect. Details are not described herein again.

According to a third aspect, this application provides a communication resource determining method. The communication resource determining method may be performed by a terminal device or a module (for example, a chip) in the terminal device. The following uses an example in which the method is performed by the terminal device for description.

In a possible implementation, the communication resource determining method includes: The terminal device determines resources indicated by a plurality of pieces of resource information. The terminal device performs detection on the resources indicated by the plurality of pieces of resource information. First resource information in the plurality of pieces of resource information indicates a first resource, the first resource carries a physical downlink control channel, and the first resource information is associated with load information of a cell to which the terminal device belongs.

In the foregoing technical solution, an access network device may determine the first resource information based on the load information of the cell. The first resource indicated by the first resource information may be used by the access network device to send the physical downlink control channel to the terminal device. The terminal device may determine the resources respectively indicated by the plurality of pieces of resource information, and detect, on the resources respectively indicated by the plurality of pieces of resource information, whether the physical downlink control channel is received, that is, the terminal device determines, in a full detection manner, whether the physical downlink control channel is received. In this manner, the resource for communicating the physical downlink control channel between the access network device and the terminal device is adapted to the load information of the cell to which the terminal device belongs.

In a possible implementation, sizes of resources used by the terminal device to detect the physical downlink control channel and indicated by different resource information in the plurality of pieces of resource information are different. For example, at least one of quantities of symbols or bandwidths of resources used by the terminal device to detect the physical downlink control channel and indicated by different resource information in the plurality of pieces of resource information are different.

In the foregoing technical solution, the access network device may indicate the plurality of pieces of resource information to the terminal device in advance, and the plurality of pieces of resource information may indicate the resources of different sizes. In this way, in cases of different load information of the cell to which the terminal device belongs, the access network device may determine transmission resources of sizes (or capacities) corresponding to the load information of the cell, and the terminal device may detect, through full detection, the physical downlink control channel communicated on the transmission resource.

In a possible implementation, the plurality of pieces of resource information further include second resource information, the second resource information indicates a second resource, and the second resource includes the first resource. In a possible implementation, a resource other than the first resource in the second resource may be used by the terminal device to receive a physical downlink shared channel. A location of the physical downlink shared channel may be indicated by rate matching pattern information on the physical downlink control channel in the first resource. The foregoing technical solution helps improve resource utilization.

In a possible implementation, the communication resource determining method further includes: The terminal device receives the plurality of pieces of resource information from the access network device via RRC signaling.

In a possible implementation, that the terminal device performs detection on the resources indicated by the plurality of pieces of resource information includes: The terminal device performs detection on a resource indicated by each piece of resource information, and determines whether the physical downlink control channel from the access network device is received.

According to a fourth aspect, this application provides a communication resource determining method. The communication resource determining method may be performed by an access network device or a module (for example, a chip) in the access network device. The following uses an example in which the method is performed by the access network device for description.

In a possible implementation, the communication resource determining method includes: The access network device determines first resource information from a plurality of pieces of resource information, where the first resource information is associated with load information of a cell of the access network device, and the first resource information in the plurality of pieces of resource information indicates a first resource. The access network device sends a physical downlink control channel to a terminal device on the first resource.

In a possible implementation, sizes of resources used by the access network device to send the physical downlink control channel and indicated by different resource information in the plurality of pieces of resource information are different.

For example, at least one of quantities of symbols or bandwidths of resources used by the access network device to send the physical downlink control channel and indicated by different resource information in the plurality of pieces of resource information are different.

In a possible implementation, the plurality of pieces of resource information further include second resource information, the second resource information indicates a second resource, and the second resource includes the first resource.

In a possible implementation, a resource other than the first resource in the second resource may be used by the access network device to send a physical downlink shared channel. A location of the physical downlink shared channel may be indicated by rate matching pattern information on the physical downlink control channel in the first resource.

In a possible implementation, the communication resource determining method further includes: The access network device sends the plurality of pieces of resource information to the terminal device via RRC signaling.

In a possible implementation, that the access network device determines first resource information from a plurality of pieces of resource information includes: The access network device determines the first resource information from the plurality of pieces of resource information based on the load information of the cell. In a possible implementation, the access network device determines, based on the load information of the cell, a size of the first resource for sending the physical downlink control channel. The access network device determines the first resource information from the plurality of pieces of resource information based on the size of the first resource.

For technical effects that can be achieved in any possible implementation of the fourth aspect, refer to descriptions of beneficial effects in the third aspect. Details are not described herein again.

According to a fifth aspect, some embodiments of this application provide a communication apparatus. The communication apparatus has a function of implementing the terminal device in any one of the first aspect or the possible implementations of the first aspect, or has a function of implementing the terminal device in any one of the third aspect or the possible implementations of the third aspect. The communication apparatus may be a terminal device, or may be a chip included in the terminal device.

The communication apparatus may alternatively have a function of implementing the access network device in any one of the second aspect or the possible implementations of the second aspect, or have a function of implementing the access network device in any one of the fourth aspect or the possible implementations of the fourth aspect. The communication apparatus may be an access network device, or may be a chip included in the access network device.

The function of the foregoing communication apparatus may be implemented by hardware, or may be implemented by hardware executing corresponding software. The hardware or software includes one or more modules, units, or means corresponding to the foregoing function.

In a possible implementation, a structure of the apparatus includes a processing module and a transceiver module. The processing module is configured to support the apparatus in performing the corresponding function of the terminal device in any one of the first aspect or the implementations of the first aspect, or performing the corresponding function of the access network device in any one of the second aspect or the implementations of the second aspect, or performing the corresponding function of the terminal device in any one of the third aspect or the implementations of the third aspect, or performing the corresponding function of the access network device in any one of the fourth aspect or the implementations of the fourth aspect.

The transceiver module is configured to support communication between the apparatus and another communication device. For example, when the apparatus is the terminal device, the transceiver module may be configured to communicate a physical downlink control channel with an access network device. The communication apparatus may further include a storage module. The storage module is coupled to the processing module, and stores program instructions and data for the apparatus. In an example, the processing module may be a processor, the transceiver module may be a transceiver, the storage module may be a memory, and the memory may be integrated with the processor, or may be disposed separately from the processor.

In another possible implementation, a structure of the apparatus includes a processor, and may further include a memory. The processor is coupled to the memory, and may be configured to execute computer program instructions stored in the memory, to enable the apparatus to perform the method in any one of the first aspect or the possible implementations of the first aspect, or perform the method in any one of the second aspect or the possible implementations of the second aspect, or perform the method in any one of the third aspect or the possible implementations of the third aspect, or perform the method in any one of the fourth aspect or the possible implementations of the fourth aspect.

Optionally, the apparatus further includes a communication interface, and the processor is coupled to the communication interface. When the apparatus is the access network device or the terminal device, the communication interface may be a transceiver or an input/output interface. When the apparatus is the chip included in the access network device or the chip included in the terminal device, the communication interface may be an input/output interface of the chip. Optionally, the transceiver may be a transceiver circuit, and the input/output interface may be an input/output circuit.

According to a sixth aspect, some embodiments of this application provide a chip system, including a processor. The processor is coupled to a memory, and the memory is configured to store a program or instructions. When the program or the instructions is/are executed by the processor, the chip system is enabled to implement the method in any one of the first aspect or the possible implementations of the first aspect, or implement the method in any one of the second aspect or the possible implementations of the second aspect, or implement the method in any one of the third aspect or the possible implementations of the third aspect, or implement the method in any one of the fourth aspect or the possible implementations of the fourth aspect.

Optionally, the chip system further includes an interface circuit, and the interface circuit is configured to exchange code instructions to the processor.

Optionally, there may be one or more processors in the chip system, and the processor may be implemented by hardware or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. For example, the memory may be a non-transitory processor, for example, a read-only memory (ROM). The memory and the processor may be integrated on a same chip, or may be arranged on different chips respectively.

According to a seventh aspect, some embodiments of this application provide a computer-readable storage medium, and the computer-readable storage medium stores a computer program or instructions. When the computer program or the instructions is/are executed, a computer is enabled to perform the method in any one of the first aspect or the possible implementations of the first aspect, or perform the method in any one of the second aspect or the possible implementations of the second aspect, or perform the method in any one of the third aspect or the possible implementations of the third aspect, or perform the method in any one of the fourth aspect or the possible implementations of the fourth aspect.

According to an eighth aspect, some embodiments of this application provide a computer program product. When a computer reads and executes the computer program product, the computer is enabled to perform the method in any one of the first aspect or the possible implementations of the first aspect, or perform the method in any one of the second aspect or the possible implementations of the second aspect, or perform the method in any one of the third aspect or the possible implementations of the third aspect, or perform the method in any one of the fourth aspect or the possible implementations of the fourth aspect.

According to a ninth aspect, some embodiments of this application provide a communication system. The communication system includes an access network device and at least one terminal device. The terminal device may have a function of the terminal device in any one of the first aspect or the possible implementations of the first aspect, and the access network device may have a function of the access network device in any one of the second aspect or the possible implementations of the second aspect. Alternatively, the terminal device may have a function of the terminal device in any one of the third aspect or the possible implementations of the third aspect, and the access network device may have a function of the access network device in any one of the fourth aspect or the possible implementations of the fourth aspect.

For technical effects that can be achieved in any one of the fifth aspect to the ninth aspect, refer to descriptions of beneficial effects in the first aspect or the third aspect. Details are not described herein again.

DESCRIPTION OF EMBODIMENTS

The following describes in detail this application with reference to the accompanying drawings.

Figure 1:
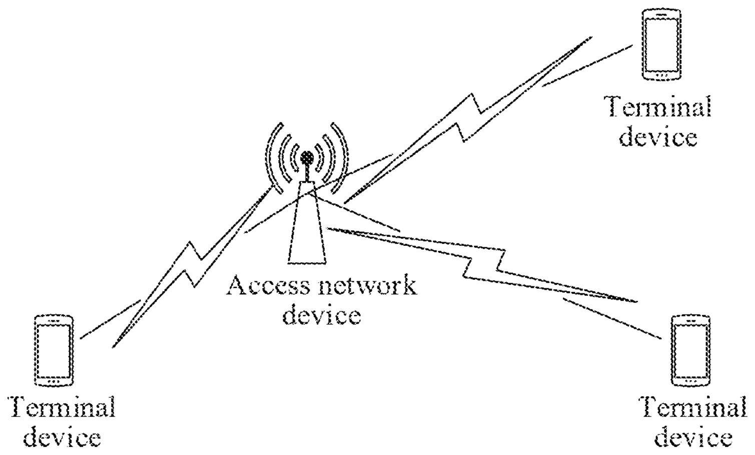
FIG. 1 is a schematic diagram of an architecture of a communication system according to this application.

FIG. 1 is a schematic diagram of an architecture of a communication system to which this application is applicable. The communication system includes terminal devices and an access network device. The terminal devices communicate with the access network device through a wireless interface.

A terminal device is a device having a wireless transceiver function. The terminal device may be deployed on the land, including an indoor or outdoor device, a handheld device, or a vehicle-mounted device, may be deployed on the water (for example, on a steamer), or may be deployed in the air (for example, on an airplane, on a balloon, or on a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or a UE.

An access network device is a device that provides a wireless communication function for the terminal device. The access network device includes but is not limited to a next generation base station (gNB), a transmission point (TRP), a transmission point (TP), and the like.

To be compatible with requirements of different services, access technologies, bandwidths, standards, and the like, an NR system may support flexible configuration of a physical downlink control channel resource, but a physical control format indicator channel (PCFICH) is absent in NR. Therefore, the access network device cannot indicate, to the terminal device in an explicit indication manner, a resource for communicating the physical downlink control channel between the access network device and the terminal device.

In this application, the resource for communicating the physical downlink control channel may also be referred to as a PDCCH resource or a downlink control resource, and the PDCCH communicated between the access network device and the terminal device may also be referred to as DCI. The PDCCH may be for scheduling a physical downlink shared channel (PDSCH). A PDSCH communicated between the access network device and the terminal device may also be referred to as downlink data. In embodiments of this application, the physical downlink control channel is referred to as a PDCCH, the physical downlink shared channel is referred to as a PDSCH, and the terminal device is referred to as a UE. It may be understood that the PDSCH, the PDCCH, and the UE are only used as examples of the physical downlink shared channel, the physical downlink control channel, and the terminal device. In different systems and different scenarios, the physical downlink shared channel, the physical downlink control channel, and the terminal device may all have different names. This is not limited in embodiments of this application.

In the NR system, the access network device may indicate, to the UE by using a CORESET and a SS, a resource (which may be referred to as a PDCCH resource below) used by the UE to detect the PDCCH. That the UE detects the PDCCH may be understood as the UE performing detection on the PDCCH resource and determining whether the PDCCH can be detected. If the access network device sends the PDCCH to the UE on the PDCCH resource, the UE may detect the PDCCH on the PDCCH resource. If the access network device does not send the PDCCH to the UE on the PDCCH resource, the UE detects no PDCCH on the PDCCH resource.

The access network device encapsulates, in the CORESET, information such as a frequency band occupied by the PDCCH in frequency domain and a quantity of symbols occupied by the PDCCH in time domain, and encapsulates, in the SS, information such as a start symbol number of the PDCCH and a monitoring periodicity of the PDCCH. A symbol in time domain may be an OFDM symbol, or may be a discrete Fourier transform spread OFDM symbol. Unless otherwise specified, all symbols in embodiments of this application are symbols in time domain.

The access network device may send configuration information to the UE when the UE performs random access. The configuration information may include the CORESET and the SS. The UE may determine, based on the CORESET and the SS that are included in the configuration information, information needed by the UE to detect the PDCCH, where the information needed by the UE to detect the PDCCH may include a quantity of symbols corresponding to detection of the PDCCH, a frequency domain location, a DCI type, an aggregation level, a corresponding quantity of detection times, and the like.

Figure 2:
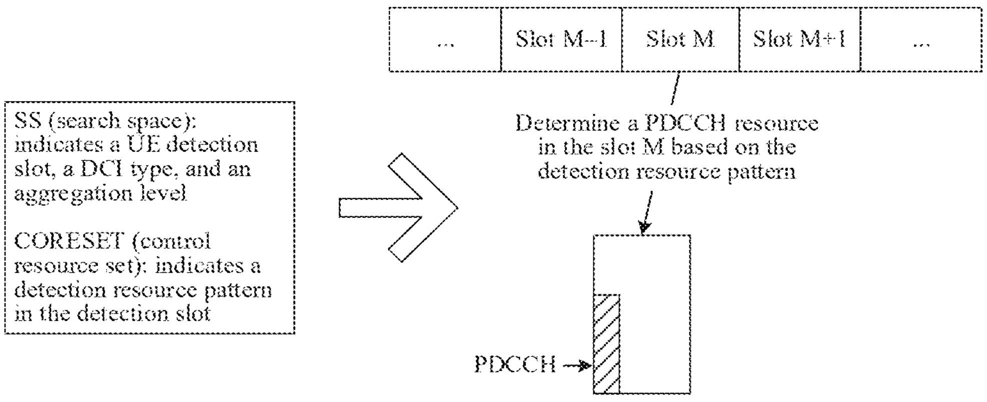
FIG. 2 is a schematic diagram of determining a PDCCH resource by a user equipment (UE) according to this application.

A schematic diagram of an example of determining a PDCCH resource by a UE is shown in FIG. 2. The left section of FIG. 2 shows configuration information received by the UE from a network. The configuration information includes a CORESET and SS. The UE may determine, based on the SS, a slot corresponding to detection of a PDCCH by the UE, a DCI type, an aggregation level, and the like. The UE may further determine a pattern based on the CORESET. The slot corresponding to the detection of the PDCCH by the UE may be referred to as a detection slot, and the pattern determined by the UE based on the CORESET is referred to as a detection resource pattern. The right section of FIG. 2 shows the UE determining the detection slot from a plurality of slots, and the detection slot is a slot M. The UE may further determine, in the slot M based on the detection resource pattern, a time domain location and a frequency domain location that correspond to the detection of the PDCCH (refer to the shaded area in the slot M shown in FIG. 2, where a vertical coordinate indicates the frequency domain location corresponding to the detection of the PDCCH by the UE, and a horizontal coordinate indicates the time domain location corresponding to the detection of the PDCCH by the UE).

Figure 3:
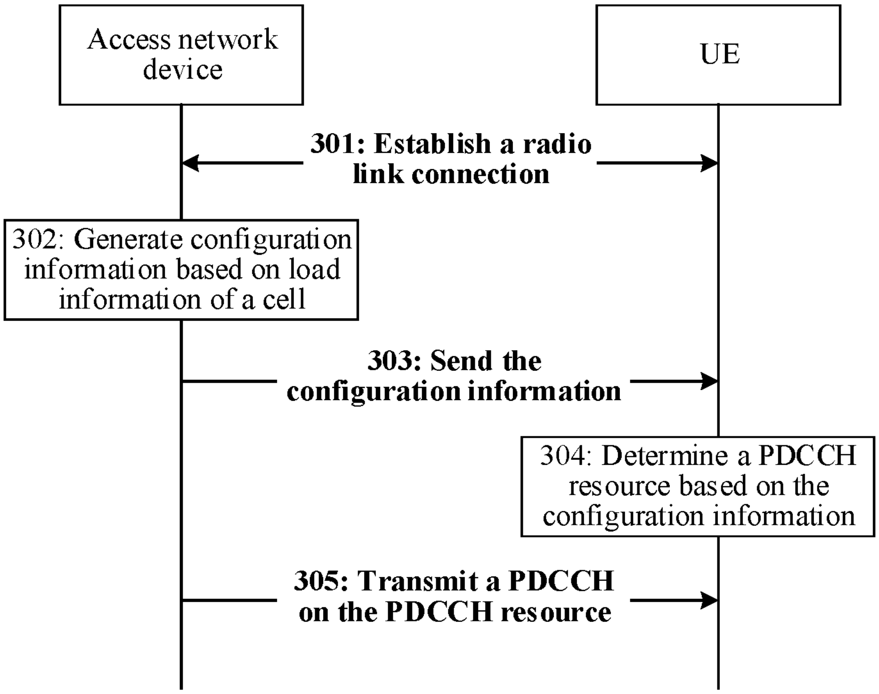
FIG. 3 is a schematic flowchart of configuring a PDCCH resource by an access network device according to this application.

FIG. 3 is a schematic flowchart of an example of configuring a PDCCH resource by an access network device according to this application.

Step 301: A UE establishes a radio link connection to the access network device.

Step 302: The access network device generates configuration information based on load information of a cell.

In this application, the access network device may correspond to a plurality of cells, and each cell may be accessed by a plurality of UEs, in other words, each cell may serve a plurality of UEs. For a UE, a cell accessed by the UE is a service cell of the UE. For each cell, the access network device may determine load information of the cell based on a load status of the cell, for example, at least one of factors such as a quantity of UEs accessing the cell, a quantity of resources requested by the UE in the cell, or a success rate of allocating a PDCCH resource by the access network device to the UE in the cell. The load information indicates the load status of the cell.

The access network device may determine, based on the load information of the cell, a size of a resource needed to transmit a PDCCH to the UE in the cell. With reference to the quantity of UEs accessing the cell, an example is used for description. Larger cell load indicates a larger quantity of UEs accessing the cell, and the access network device needs to separately send the PDCCH to a plurality of UEs accessing the cell. Therefore, the access network device needs more resources to transmit the PDCCH to the UEs in the cell, that is, a large PDCCH resource is needed. Similarly, smaller cell load indicates fewer resources needed by the access network device to transmit the PDCCH to the UEs in the cell, that is, a small PDCCH resource is required. The size of the resource may also be referred to as a resource capacity, and may be measured by using a time domain resource size and a frequency domain resource size. The time domain resource size may be a quantity of symbols included in one slot, and the frequency domain resource size may be a resource bandwidth or a quantity of resource blocks (RBs) included in frequency domain.

Further, the access network device may generate a CORESET and SS based on the size of the resource needed to transmit the PDCCH to the UE in the cell, where the CORESET and the SS are used as the configuration information.

Step 303: The access network device sends the configuration information to the UE, where the configuration information may be sent by the access network device to the UE via RRC signaling.

Step 304: The UE determines the PDCCH resource based on the configuration information. In a possible implementation, the UE may determine, based on the SS included in the configuration information, a UE detection slot, a DCI type, an aggregation level, and the like; determine, based on the CORESET included in the configuration information, a detection resource pattern in the UE detection slot; and determine, from the detection slot based on the detection resource pattern, a resource (that is, the PDCCH resource) for detecting the PDCCH.

Step 305: The access network device transmits the PDCCH on the PDCCH resource.

The UE may perform detection for the PDCCH on the PDCCH resource. If the access network device sends the PDCCH to the UE on the PDCCH resource, the UE may detect the PDCCH on the PDCCH resource. If the access network device does not send the PDCCH to the UE on the PDCCH resource, the UE detects no PDCCH on the PDCCH resource.

In a possible implementation, the PDCCH is for scheduling a PDSCH, and the UE may further receive a PDSCH from the access network device based on a resource location of the PDSCH indicated in the PDCCH.

The access network device may further adjust, based on the load information of the cell, the size of the resource needed to transmit the PDCCH to the UE in the cell. When determining that the cell load increases, the access network device may increase the PDCCH resource. When determining that the cell load decreases, the access network device may decrease the PDCCH resource. In this manner, the access network device can flexibly schedule the PDCCH resource. This helps improve resource utilization.

Because the access network device needs to send the configuration information to the UE via RRC signaling, and an RRC signaling-based reconfiguration process is slow and may take long time, the access network device may need to wait, for example, for several or dozens of TTIs, before resending configuration information to the UE. Consequently, the size of the resource for communicating the PDCCH between the access network device and the UE is not adapted to the cell load in a timely manner.

In view of this, this application provides a communication resource determining method. The method is applicable when the cell load changes, so that a resource for communicating a PDCCH between an access network device and a UE is adapted to the cell load. The method may be performed by the terminal device (such as a UE) and the access network device that are shown in FIG. 1 as an example.

In a possible implementation, the access network device may send first information to the UE in advance, and the first information may include a plurality of pieces of indication information and resource information corresponding to the plurality of pieces of indication information. The resource information corresponding to the indication information may indicate a PDCCH resource (or may indicate a location of the PDCCH resource).

In an implementation, the resource information may indicate a time domain resource and a frequency domain resource of the PDCCH. The time domain resource may be one or more symbols that can be occupied by the PDCCH in a slot. For example, one slot in an NR system may include 14 symbols, and the PDCCH can occupy one symbol, two symbols, or three symbols in the slot. The frequency domain resource may be a cell bandwidth. The cell bandwidth may be understood as a bandwidth occupied by a cell in which the UE is located. The cell bandwidth may be, for example, 20 MHz or 60 MHz. In an example, the resource information may include a CORESET and SS.

In some embodiments, the indication information may be BWP information. That is, the first information may include a plurality of pieces of BWP information and resource information respectively corresponding to the plurality of pieces of BWP information. Alternatively, the indication information may be detection resource pattern information. That is, the first information may include a plurality of pieces of detection resource pattern information and resource information respectively corresponding to the plurality of pieces of detection resource pattern information. For implementations, refer to descriptions in the following related embodiments in FIG. 4 to FIG. 8.

In this application, resource sizes of PDCCH resources respectively indicated by the plurality of pieces of resource information may be the same or may be different. A resource size of a PDCCH resource may be measured by using a quantity of symbols occupied by the PDCCH resource in time domain and a bandwidth occupied by the PDCCH resource in frequency domain. Quantities of symbols included in the PDCCH resources respectively indicated by the plurality of pieces of resource information may be the same or may be different. For example, in the plurality of pieces of resource information, a quantity of symbols included in a PDCCH resource indicated by one piece of resource information is 1, and a quantity of symbols included in a PDCCH resource indicated by another piece of resource information is 2. In other words, the quantities of symbols included in the PDCCH resources indicated by the two pieces of resource information are different. Bandwidths of the PDCCH resources respectively indicated by the plurality of pieces of resource information may be the same or may be different. For example, in the plurality of pieces of resource information, a bandwidth of a PDCCH resource indicated by one piece of resource information is 20 MHz, and a bandwidth of a PDCCH resource indicated by another piece of resource information is 20 MHz. In other words, the bandwidths included in the PDCCH resources indicated by the two pieces of resource information are the same.

In a possible manner, the access network device may configure the first information for the UE via higher layer signaling, where the higher layer signaling is, for example, RRC signaling. For example, the access network device may send an RRC reconfiguration message to the UE, where the RRC reconfiguration message includes the first information.

Figure 4:
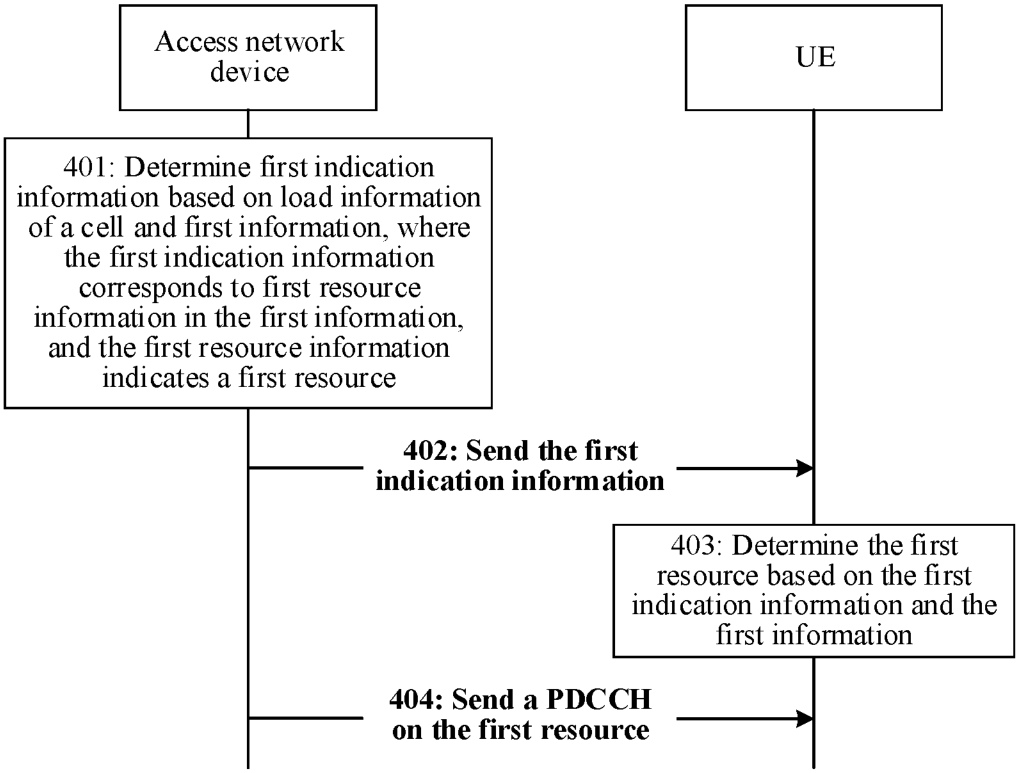
FIG. 4 is a schematic flowchart of a communication resource determining method according to this application.

The following provides explanations with reference to a schematic flowchart of a communication resource determining method shown in FIG. 4. A procedure is as follows.

Step 401: An access network device determines first indication information based on load information of a cell and first information.

The access network device may monitor a load status of the cell, and then determine the load information of the cell based on the load status of the cell. For example, the access network device may monitor the load status of the cell at each TTI, and then determine the load information of the cell based on load statuses of the cell at a plurality of TTIs. The load status of the cell is, for example, a quantity of UEs in an RRC connected state in the cell, or a success rate of allocating a PDCCH resource by the access network device to a UE in the cell.

In a possible manner, the load information of the cell may be a load level of the cell, and the load level of the cell may include, for example, light load, medium load, and heavy load. For example, when the quantity of UEs in the RRC connected state in the cell is less than 500, the load level of the cell is the light load; when the quantity of UEs in the RRC connected state in the cell is greater than 500 and less than 1000, the load level of the cell is the medium load; and when the quantity of UEs in the RRC connected state in the cell is greater than 1000, the load level of the cell is the heavy load.

The first information may include a plurality of pieces of resource information, the first indication information may correspond to first resource information in the plurality of pieces of resource information, and the first resource information may indicate a first resource.

The first information may further include a plurality of pieces of indication information, and the plurality of pieces of indication information correspond to the plurality of pieces of resource information. For example, the plurality of pieces of indication information may be in a one-to-one correspondence with the plurality of pieces of resource information.

Further, in an example, the first indication information is one of the plurality of pieces of indication information, and resource information corresponding to the first indication information in the first information is the first resource information. For example, the first information includes indication information 1, indication information 2, and indication information 3, and resource information 1, resource information 2, and resource information 3 respectively corresponding to the indication information 1, the indication information 2, and the indication information 3. If the first indication information is, for example, the indication information 1, the first resource information is the resource information 1.

In another example, the first indication information corresponds to one of the plurality of pieces of indication information (where it may be understood that the first indication information is not included in the plurality of pieces of indication information, and the indication information corresponding to the first indication information is included in the plurality of pieces of indication information), and the indication information corresponding to the first indication information may correspond to the first resource information in the first information. For example, the first information includes indication information 1, indication information 2, and indication information 3, and resource information 1, resource information 2, and resource information 3, respectively corresponding to the indication information 1, the indication information 2, and the indication information 3. The first indication information is, for example, indication information A. The indication information A corresponds to the indication information 1, and the indication information 1 in the first information corresponds to the resource information 1. It may also be understood that the first resource information corresponding to the indication information A is the resource information 1.

For ease of description, the following may use an example in which the first indication information is one piece of indication information in the first information to explain an implementation in which the access network device determines the first indication information based on the load information of the cell and the first information.

The access network device may determine the first indication information from the plurality of pieces of indication information based on the load information of the cell. The resource information corresponding to the first indication information is the first resource information. A size of a PDCCH resource indicated by the first resource information may match the load information of the cell. It may be understood that the access network device may determine, from the plurality of pieces of indication information in the first information based on the load information of the cell, the first indication information corresponding to the PDCCH resource whose size matches the load information of the cell.

The first indication information is associated with the load information of the cell, where associating may also be considered as corresponding or having a correspondence. For example, the load information of the cell is the load level of the cell. When the load level of the cell includes the light load, the medium load, and the heavy load, the light load, the medium load, and the heavy load may respectively correspond to different indication information in the first information. Correspondingly, the access network device may determine, based on the load level of the cell, the first indication information associated with the load level of the cell in the first information. Associating may also be considered as: The first indication information needs to be determined based on the load information of the cell.

In a possible manner, the first information may include three pieces of indication information and resource information respectively corresponding to the three pieces of indication information, where the three pieces of indication information respectively correspond to the light load, the medium load, and the heavy load. Further, a PDCCH resource corresponding to the light load may be smaller than a PDCCH resource corresponding to the medium load, and the PDCCH resource corresponding to the medium load may be smaller than a PDCCH resource corresponding to the heavy load. Quantities of symbols (where resource bandwidths are the same) are used as an example. The first information may include the indication information 1, the indication information 2, and the indication information 3 respectively corresponding to the light load, the medium load, and the heavy load. The resource information 1 corresponding to the indication information 1 indicates that the PDCCH resource includes one symbol in time domain, the resource information 2 corresponding to the indication information 2 indicates that the PDCCH resource includes two symbols in time domain, and the resource information 3 corresponding to the indication information 3 indicates that the PDCCH resource includes three symbols in time domain.

In a possible implementation, the access network device may determine the load information of the cell when the UE performs access, and then determine the first indication information based on the load information of the cell. In another possible implementation, when the load information of the cell changes, the access network device may determine the first indication information based on changed load information of the cell.

In addition, in an example in which the first indication information corresponds to one of the plurality of pieces of indication information, it may be understood that the access network device determines, from the first information based on the load information of the cell and the first information, third indication information associated with the load level of the cell, where the third indication information corresponds to the first indication information. For implementations, refer to the foregoing manner in which the access network device determines the first indication information. Details are not described again.

Step 402: The access network device sends the first indication information to the UE.

When indication information is BWP information, the first information may include a plurality of pieces of BWP information and resource information respectively corresponding to the plurality of pieces of BWP information. The first indication information may be first BWP information, and the first resource information may be resource information corresponding to the first BWP information in the first information. It should be additionally noted that the first BWP information can not only indicate the UE to determine the first resource information, but also indicate or be used by the UE to switch an operating BWP based on the first BWP information.

When indication information is detection resource pattern information, the first information may include a plurality of pieces of detection resource pattern information and resource information respectively corresponding to the plurality of pieces of detection resource pattern information. The first indication information may be first detection resource pattern information. The UE may determine, from the first information based on the first detection resource pattern information, the first resource information corresponding to the first detection resource pattern information, and then determine the first resource based on the first resource information.

The access network device may send DCI to the UE, where the DCI carries the first indication information.

Step 403: The UE determines the first resource based on the first indication information and the first information.

The UE may determine the first resource information from the first information based on the first indication information, and then determine the first resource based on the first resource information, where the first resource is a resource used by the UE to detect a PDCCH.

It should be additionally noted that the access network device may indicate all UEs in the cell to change resources for detecting the PDCCH. Alternatively, the access network device may indicate a part of the UEs in the cell to change resources for detecting the PDCCH, and the part of the UEs in the cell may be referred to as target UEs.

Possible manner 1: The access network device may send the first indication information to all the UEs in the cell. Correspondingly, all the UEs in the cell may determine the first resource based on the first indication information.

In the possible manner 1, it may be set that sizes of PDCCH resources indicated by two pieces of resource information in the first information are different. For example, a size of a resource indicated by the resource information 2 is larger than a size of a resource indicated by the resource information 1. All the UEs in the cell detect the PDCCH based on the resource indicated by the resource information 1. When determining that the cell load increases, the access network device may send, to all the UEs in the cell, the indication information 2 indicating the resource information 2. All the UEs in the cell may determine, based on the resource information 2 corresponding to the indication information 2, the resource for detecting the PDCCH.

Possible manner 2: The access network device may select the target UE from the UEs in the cell according to a preset policy, and send the first indication information to the target UE. Correspondingly, the target UE in the cell may determine the first resource based on the first indication information.

In the possible manner 2, it may be set that sizes of PDCCH resources indicated by two pieces of resource information in the first information are the same. For example, a resource indicated by the resource information 1 has a same size as a resource indicated by the resource information 2. All the UEs in the cell detect the PDCCH based on the resource indicated by the resource information 1. When determining that the cell load increases, the access network device may select the target UE from the UEs in the cell, and send, to the target UE, the indication information 2 indicating the resource information 2. Correspondingly, after receiving the indication information 2, the target UE may determine, based on the resource information 2, the resource for detecting the PDCCH. A UE that receives no indication information 2 in the cell may still determine, based on the resource information 1, a resource for detecting the PDCCH.

In the possible manner 2, the preset policy may be a random selection policy. For example, there are 1000 UEs in the cell, and the access network device may randomly select 500 UEs from the 1000 UEs as the target UEs. The preset policy may alternatively be that the access network device performs selection based on signal strength. For example, the access network device may determine signal strength of each UE in the cell, and select a UE whose signal strength meets a preset condition. For example, there are 1000 UEs in the cell. The access network device may determine signal strength of the 1000 UEs, and then select, from the 1000 UEs, a UE whose signal strength is greater than a preset threshold as the target UE. Alternatively, the access network device may sort the 1000 UEs in descending order of signal strength, and select first 500 UEs as the target UEs based on the order. The preset policy may alternatively be another policy. This is not limited in this application.

Optionally, in step 404, the access network device may send the PDCCH to the UE on the first resource. Correspondingly, the UE may receive the PDCCH on the first resource in a detection manner.

It should be additionally noted that the first information may further include second indication information. The second indication information in the first information corresponds to second resource information. A second resource indicated by the second resource information may be a maximum PDCCH resource that is configured by the access network device for communication of the PDCCH with the UE. It may be understood that the access network device may send the PDCCH to the UE on all or a part of resources in the second resource. When the access network device sends the PDCCH to the UE on all the resources in the second resource, the second resource is the same as the first resource. When the access network device sends the PDCCH to the UE on the part of the resources in the second resource, the second resource includes the first resource. In the latter case, the access network device may not only communicate the PDCCH with the UE over the first resource, but also communicate a PDSCH with the UE over a resource other than the first resource in the second resource. For example, the PDSCH may be scheduled by using the PDCCH in the first resource.

The following describes some embodiments of this application in detail by using an example in which the indication information is the BWP information.

Figure 5:
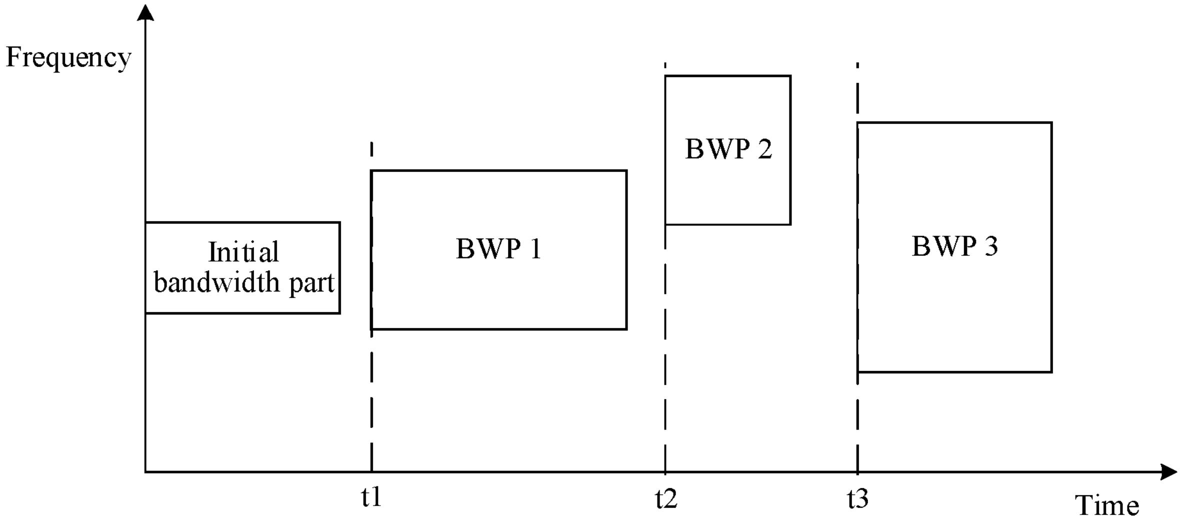
FIG. 5 is a schematic diagram of a plurality of bandwidth parts (BWPs) corresponding to a UE according to this application.

When the UE is in an RRC idle state, the access network device may configure an initial bandwidth part (initial BWP) by using a system message, for initial access of the UE. When the UE enters the RRC connected state, the access network device may configure a plurality of dedicated bandwidth parts (dedicated BWPs) for the UE, and the access network device may activate the dedicated BWPs of the UE by using a dynamic indication. FIG. 5 is a schematic diagram of an example of a plurality of BWPs corresponding to a UE. The UE accesses an access network device by using an initial BWP. The UE enters an RRC connected state, and then the access network device configures three dedicated BWPs for the UE. The three dedicated BWPs may be respectively represented as a BWP 1, a BWP 2, and a BWP 3. For example, at time t1, the access network device activates the BWP 1 for the UE, and the UE may communicate with the access network device on the BWP 1. At time t2, the access network device activates the BWP 2 for the UE, and the UE may communicate with the access network device on the BWP 2. At time t3, the access network device activates the BWP 3 for the UE, and the UE may communicate with the access network device on the BWP 3. At a same moment, the UE has only one activated dedicated BWP. A dedicated BWP currently activated for the UE may be referred to as an operating BWP. It may also be understood that the UE operates on the operating BWP, and the UE may communicate with the access network device on the operating BWP.

The first information may include the plurality of pieces of BWP information and the resource information corresponding to the plurality of pieces of BWP information, and a BWP indicated by BWP information may be an initial BWP or a dedicated BWP.

In an example, resource information corresponding to the BWP information may be configuration information of the PDCCH resource. The configuration information of the PDCCH resource may include a CORESET and SS. The UE may determine the PDCCH resource based on the configuration information of the PDCCH resource. The configuration information of the PDCCH resource is briefly referred to as configuration information below.

It may be understood that the first information may include the plurality of pieces of BWP information and configuration information respectively corresponding to the plurality of pieces of BWP information. For example, for a correspondence between the BWP information and the configuration information that are included in the first information, refer to Table 1. BWP information 1 corresponds to configuration information 1, BWP information 2 corresponds to configuration information 2, and the like. The first information may be sent by the access network device to the UE via one piece of RRC signaling. In this example, after receiving the first BWP information, the UE may obtain, through matching, the configuration information (namely, the first resource information, which may also be referred to as first configuration information) from the first information based on the first BWP information, and then determine the first resource based on the first configuration information.

TABLE 1

| BWP information | Configuration information |
|---|---|
| BWP information 1 | Configuration information 1 |
| BWP information 2 | Configuration information 2 |
| BWP information 3 | Configuration information 3 |
| . . . | . . . |

In another example, resource information corresponding to the BWP information may alternatively be an identifier, and the identifier may indicate configuration information. It may be understood that the first information includes second information and third information, the second information includes the plurality of pieces of BWP information and identifiers respectively corresponding to the plurality of pieces of BWP information, and the third information includes the plurality of identifiers and configuration information respectively indicated by the plurality of identifiers. For example, for a correspondence between the BWP information and the identifier that are included in the second information, refer to Table 2. For a correspondence between the configuration information and the identifier that are included in the third information, refer to Table 3. The second information and the third information may be carried in same RRC signaling, or may be carried in different RRC signaling.

In this example, after receiving the first BWP information, the UE may obtain, through matching, a target identifier (namely, the first resource information) from the second information based on the first BWP information, obtain, through matching, the configuration information (which may also be referred to as first configuration information) from the third information based on the target identifier, and then determine the first resource based on the first configuration information.

TABLE 2

| Indication information | Identifier |
|---|---|
| BWP information 1 | Identifier 1 |
| BWP information 2 | Identifier 2 |
| BWP information 3 | Identifier 3 |
| . . . | . . . |

TABLE 3

| Identifier | Configuration information |
|---|---|
| Identifier 1 | Configuration information 1 |
| Identifier 2 | Configuration information 2 |
| Identifier 3 | Configuration information 3 |
| . . . | . . . |

The first information may alternatively include the plurality of pieces of BWP information and other information respectively corresponding to the plurality of pieces of BWP information. The other information may further indicate the configuration information. The UE may determine the other information corresponding to the first BWP information, and then determine the configuration information corresponding to the other information. That is, the first information is mainly used by the UE to determine the first resource based on the first BWP information. Specific content of the first information may not be limited in this application. For ease of description, the following uses an example in which the first information includes the plurality of pieces of BWP information and the configuration information respectively corresponding to the plurality of pieces of BWP information for description.

In the first information, sizes of resources indicated by different configuration information may be the same or different. For example, quantities of symbols in the resources indicated by different configuration information may be the same or different, and resource bandwidths of resources indicated by different configuration information may be the same or different. Depending on whether the sizes of the resources indicated by different configuration information are the same, the following provides descriptions in at least two cases.

Case 1: Configuration information in the first information may correspond to resources of different sizes.

For example, a plurality of pieces of BWP information in Table 4 may include BWP information 1, BWP information 2, and BWP information 3. The BWP information 1, the BWP information 2, and the BWP information 3 are BWP information respectively corresponding to a BWP 1, a BWP 2, and a BWP 3, and respectively correspond to configuration information 11, configuration information 12, and configuration information 13.

For example, the configuration information 11 corresponds to one symbol and 20 MHz, and the configuration information 11 may indicate that the PDCCH occupies the 1$^{st}$ symbol in a slot in time domain, and occupies 20 MHz in frequency domain.

The configuration information 12 corresponds to two symbols and 20 MHz, and the configuration information 12 may indicate that the PDCCH occupies the 1$^{st}$ symbol and the 2$^{nd}$ symbol in the slot in time domain, and occupies 20 MHz in frequency domain.

The configuration information 13 corresponds to three symbols and 20 MHz, and the configuration information 13 may indicate that the PDCCH occupies the 1$^{st}$ symbol, the 2$^{nd}$ symbol, and the 3$^{rd}$ symbol in the slot in time domain, and occupies 20 MHz in frequency domain.

TABLE 4

| Indication information | Configuration information | Quantity of symbols | Resource bandwidth |
|---|---|---|---|
| BWP information 1 | Configuration information 11 | 1 | 20 MHz |
| BWP information 2 | Configuration information 12 | 2 | 20 MHz |
| BWP information 3 | Configuration information 13 | 3 | 20 MHz |

It may be understood that the access network device may configure the maximum PDCCH resource (namely, the second resource) for the UE, and the second resource may be indicated by the second resource information corresponding to the second indication information. The second resource information may also be referred to as second configuration information. With reference to the example in Table 4, the second indication information is the BWP information 3, the second configuration information is the configuration information 13, and the second resource may be indicated by the configuration information 13 corresponding to the BWP information 3. The second resource occupies the 1$^{st}$ symbol, the 2$^{nd}$ symbol, and the 3$^{rd}$ symbol in the slot in time domain, and occupies 20 MHz in frequency domain. For example, the second resource may include a resource indicated by the configuration information 12, or may include a resource indicated by the configuration information 11.

When the load information of the cell changes, for example, the load level of the cell changes from the light load to the medium load, for another example, the load level of the cell changes from the heavy load to the medium load, the access network device may determine, based on current load information of the cell, a size of a resource for communicating the PDCCH, and send indication information (namely, the first BWP information) corresponding to the size of the resource to the UE, where the first BWP information may indicate the UE to switch the operating BWP.

For ease of description, in this application, a first BWP and a second BWP may be distinguished. The UE operates on the second BWP, and then the UE receives the first BWP information from the access network device. The UE switches the operating BWP to the first BWP based on the first BWP information. The first BWP is a BWP corresponding to the first BWP information. It may be understood that an operating BWP used before the UE receives the first BWP information is referred to as the second BWP, and an operating BWP used after the UE receives the first BWP information is referred to as the first BWP.

In an implementation, when the cell load increases, the access network device may send the first BWP information to the UE. After receiving the first BWP information, the UE switches from the second BWP on which the UE currently operates to the first BWP. The UE may further determine, based on the first BWP information and the first information, the first configuration information corresponding to the first BWP information in the first information. The UE determines the PDCCH resource based on the first configuration information, and detects the PDCCH on the PDCCH resource. In some embodiments, the PDCCH resource corresponding to the first BWP is larger than a PDCCH resource corresponding to the second BWP. This helps the access network device transmit the PDCCH over more resources.

For example, with reference to Table 4, the load level of the cell is the light load. For example, there are 400 UEs in the RRC connected state in the cell, and the access network device may schedule all the 400 UEs in the cell to the BWP 1. Then, the access network device determines that the load level of the cell changes from the light load to the medium load. For example, a quantity of UEs in the RRC connected state in the cell increases to 700. The access network device may send the BWP information 2 to the 700 UEs, and the 700 UEs may switch from the BWP 1 on which the 700 UEs currently operate to the BWP 2. The 700 UEs may determine the PDCCH resource based on the configuration information 12.

In another implementation, when the cell load decreases, the access network device may send the first BWP information to the UE. After receiving the first BWP information, the UE switches from the second BWP on which the UE currently operates to the first BWP, determines the first configuration information corresponding to the first BWP, determines the PDCCH resource based on the first configuration information, and detects the PDCCH on the PDCCH resource. In some embodiments, the PDCCH resource corresponding to the first BWP is smaller than a PDCCH resource corresponding to the second BWP. This helps save resources.

For example, still with reference to Table 4, the load level of the cell is the medium load. For example, there are 700 UEs in the RRC connected state in the cell, and the access network device may schedule all the 700 UEs in the cell to the BWP 2. Then, a part of the UEs in the cell enter the RRC idle state or an RRC inactive state from the RRC connected state, or a part of the UEs move to another cell. The access network device determines that the load level of the cell changes from the medium load to the light load. For example, the quantity of UEs in the RRC connected state in the cell decreases to 400. The access network device may send the BWP information 1 to the 400 UEs, and the 400 UEs switch, based on an indication of the BWP information 1, from the BWP 2 on which the 400 UEs currently operate to the BWP 1. Further, the 400 UEs may determine the PDCCH resource based on the configuration information 11.

Figure 6:
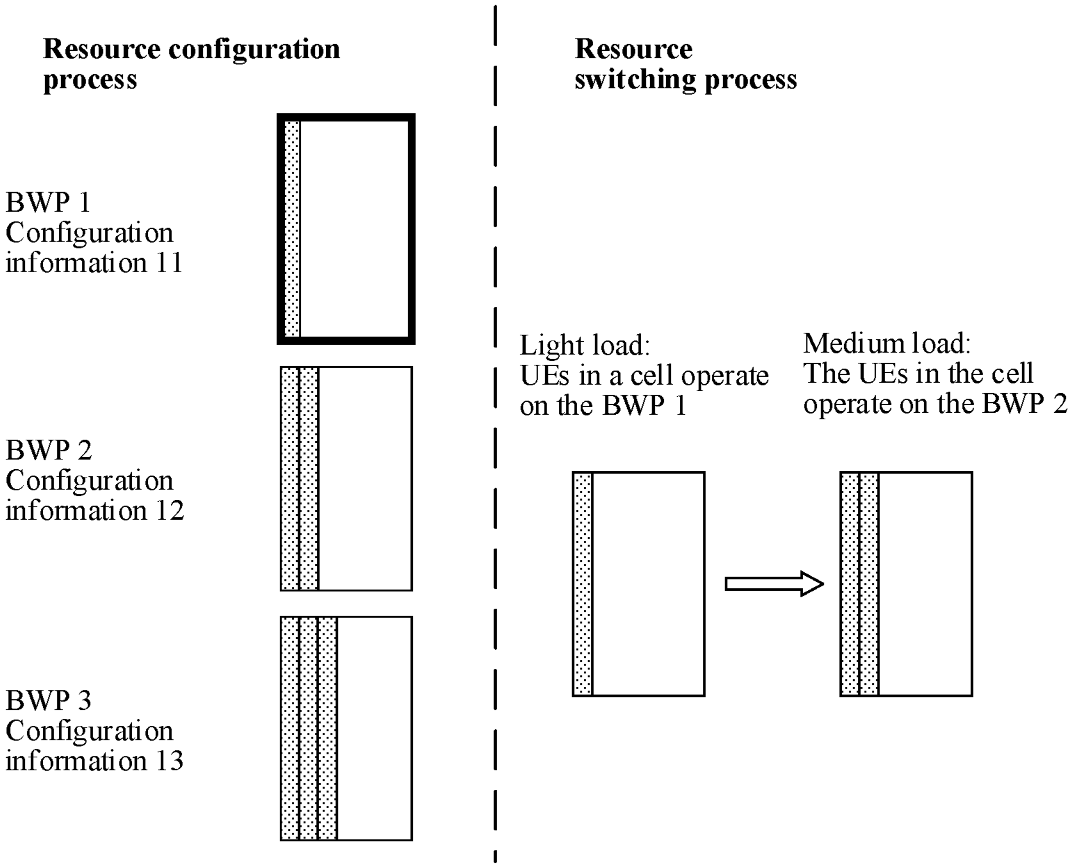
FIG. 6 is a first schematic diagram of configuring and scheduling a PDCCH resource by an access network device according to this application.

Explanations are further provided with reference to a schematic diagram of an example of configuring and scheduling a PDCCH resource by an access network device shown in FIG. 6.

It should be noted in advance that there are a plurality of blocks (where for example, a bold part represents one block) in FIG. 6, and the plurality of blocks may be understood as resources configured by the access network device for a UE. A horizontal coordinate of the block indicates a time domain resource (for example, one slot), and a vertical coordinate of the block indicates a frequency domain resource (for example, a cell bandwidth). Each block includes a shaded area and a non-shaded area. The shaded area indicates a PDCCH resource configured by the access network device for the UE, and a resource indicated by the non-shaded area may be for communicating a PDSCH between the access network device and the UE. It should be noted that this description is also applicable to another schematic diagram of configuring and scheduling the PDCCH resource by the access network device.

FIG. 6 may be divided into a resource configuration process and a resource switching process. The resource configuration process may be understood as a process in which the access network device sends first information to the UE, and the resource switching process may be understood as a process in which the access network device indicates first indication information to the UE in a cell after determining that cell load changes. It should be noted that this description is also applicable to another schematic diagram of configuring and scheduling the PDCCH resource by the access network device.

In the resource configuration process, the access network device may send the first information to the UE via RRC signaling. Correspondingly, the UE receives the first information from the access network device via RRC signaling. The first information may include configuration information 11, configuration information 12, and configuration information 13 respectively corresponding to a BWP 1, a BWP 2, and a BWP 3. The configuration information 11, the configuration information 12, and the configuration information 13 may each indicate a PDCCH resource configured by the access network device for the UE. Details are as follows:

For a frequency domain resource included in a PDCCH resource indicated by configuration information, refer to a proportion of the block occupied by the shaded area on the vertical coordinate. For example, a frequency domain resource indicated by the configuration information 12 occupies all blocks on the vertical coordinate. This indicates that a bandwidth occupied by the frequency domain resource is the same as a bandwidth (for example, the cell bandwidth) indicated by the block. As shown in FIG. 6, the PDCCH resources indicated by the configuration information 11, the configuration information 12, and the configuration information 13 may include a same bandwidth, and the bandwidth may be the cell bandwidth.

For a time domain resource included in the PDCCH resource indicated by the configuration information, refer to a quantity of shaded blocks in the shaded area on the horizontal coordinate. One shaded block may represent one symbol. For example, a time domain resource indicated by the configuration information 12 includes two symbols, and the two symbols may occupy the $1^{st}$ symbol and the $2^{nd}$ symbol in the slot. Similarly, a time domain resource indicated by the configuration information 11 includes the $1^{st}$ symbol in the slot, and a time domain resource indicated by the configuration information 13 includes the $1^{st}$ symbol, the $2^{nd}$ symbol, and the $3^{rd}$ symbol in the slot.

In the resource switching process, when a load level of the cell is light load, the access network device schedules the UE in the cell to operate on the BWP 1. Correspondingly, the UE in the cell determines, based on the configuration information 11, the resource for detecting a PDCCH. When the load level of the cell changes from the light load to medium load, the access network device schedules the UE in the cell from the BWP 1 to the BWP 2. Correspondingly, the UE in the cell determines, based on the configuration information 12, the resource (namely, a first resource) for detecting the PDCCH.

Case 2: Configuration information in the first information may correspond to resources of a same size.

For example, a plurality of pieces of BWP information in Table 5 include BWP information 1, BWP information 2, and BWP information 3. The BWP information 1, the BWP information 2, and the BWP information 3 are BWP information respectively corresponding to a BWP 1, a BWP 2, and a BWP 3, and respectively correspond to configuration information 21, configuration information 22, and configuration information 23.

For example, the configuration information 21 corresponds to one symbol and 20 MHz, and the configuration information 21 may indicate that the PDCCH occupies the $1^{st}$ symbol in a slot in time domain, and occupies 20 MHz in frequency domain.

The configuration information 22 corresponds to one symbol and 20 MHz, and the configuration information 22 may indicate that the PDCCH occupies the $2^{nd}$ symbol in the slot in time domain, and occupies 20 MHz in frequency domain.

The configuration information 23 corresponds to one symbol and 20 MHz, and the configuration information 23 may indicate that the PDCCH occupies the $3^{rd}$ symbol in the slot in time domain, and occupies 20 MHz in frequency domain.

TABLE 5

| Indication information | Configuration information | Quantity of symbols | Resource bandwidth |
|---|---|---|---|
| BWP information 1 | Configuration information 21 | 1 | 20 MHz |
| BWP information 2 | Configuration information 22 | 1 | 20 MHz |
| BWP information 3 | Configuration information 23 | 1 | 20 MHz |

It may be understood that the access network device may configure the maximum PDCCH resource (namely, the second resource) for the UE, and the second resource may be indicated by a plurality of pieces of configuration information. With reference to the example in Table 5, the second resource may be jointly indicated by the configuration information 21, the configuration information 22, and the configuration information 23. The second resource occupies the $1^{st}$ symbol, the $2^{nd}$ symbol, and the $3^{rd}$ symbol in the slot in time domain, and occupies 20 MHz in frequency domain. For example, the second resource may include a resource indicated by the configuration information 22, or may include a resource indicated by the configuration information 21, or may include a resource indicated by the configuration information 23.

When the load information of the cell changes, for example, the load level of the cell changes from the light load to the medium load, for another example, the load level of the cell changes from the heavy load to the medium load, the access network device may determine, based on current load information of the cell, the target UE and a size of a resource for communication of the PDCCH with the target UE, and send indication information (namely, the first BWP information) corresponding to the size of the resource to the target UE, where the first BWP information may indicate the target UE to switch the operating BWP.

In an implementation, when the cell load increases, the access network device may determine the target UE from the UEs in the cell, and send the first BWP information to the target UE. After receiving the first BWP information, the target UE switches from the second BWP on which the target UE currently operates to the first BWP. The target UE may further determine, based on the first BWP information and the first information, the first configuration information corresponding to the first BWP information in the first information. The target UE determines the PDCCH resource based on the first configuration information, and detects the PDCCH on the PDCCH resource. In this manner, the access network device schedules the target UE in the cell from the second BWP to the first BWP, and another part of the UEs in the cell still operate on the second BWP. In this manner, the UEs in the cell may be distributed to different BWPs, and the UEs operating on different BWPs may perform detection over different PDCCH resources.

For example, with reference to Table 5, a resource corresponding to the BWP information 1 may be used for detection by 600 UEs. In the cell, 1000 UEs operate on the BWP 1, and the access network device may send the BWP information 2 to 400 UEs (namely, the target UEs) in the 1000 UEs. The 400 UEs switch, based on the BWP information 2, from the BWP 1 on which the 400 UEs currently operate to the BWP 2. Therefore, the 1000 UEs in the cell may be distributed to different BWPs. For example, the 400 UEs scheduled to the BWP 2 may determine the PDCCH resource based on the configuration information 22, and 600 UEs still operating on the BWP 1 may determine the PDCCH resource based on the configuration information 21.

In another implementation, when the cell load decreases, the access network device may send the first BWP information to the target UE in the cell. After receiving the first BWP information, the target UE switches from the second BWP on which the target UE currently operates to the first BWP, determines the first configuration information corresponding to the first BWP, determines the PDCCH resource based on the first configuration information, and detects the PDCCH on the PDCCH resource. In this manner, the access network device schedules the target UE in the cell from the second BWP to the first BWP, so that the target UE and a UE that originally operates on the first BWP may operate on a same BWP. In this manner, UEs distributed to different BWPs in the cell may be aggregated to a same BWP, and the UEs operating on the same BWP may use a same PDCCH resource for detection. This helps improve resource utilization.

For example, still with reference to Table 5, the resource corresponding to the BWP information 1 may be used for detection by 600 UEs. In the cell, 200 UEs operate on the BWP 1, and 300 UEs operate on the BWP 2. The access network device may send the BWP information 1 to the 300 UEs operating on the BWP 2. The 300 UEs may switch from the BWP 2 on which the 300 UEs currently operate to the BWP 1. Therefore, 500 UEs operate on the BWP 1. The 500 UEs may determine the PDCCH resource based on the configuration information 21.

Figure 7:
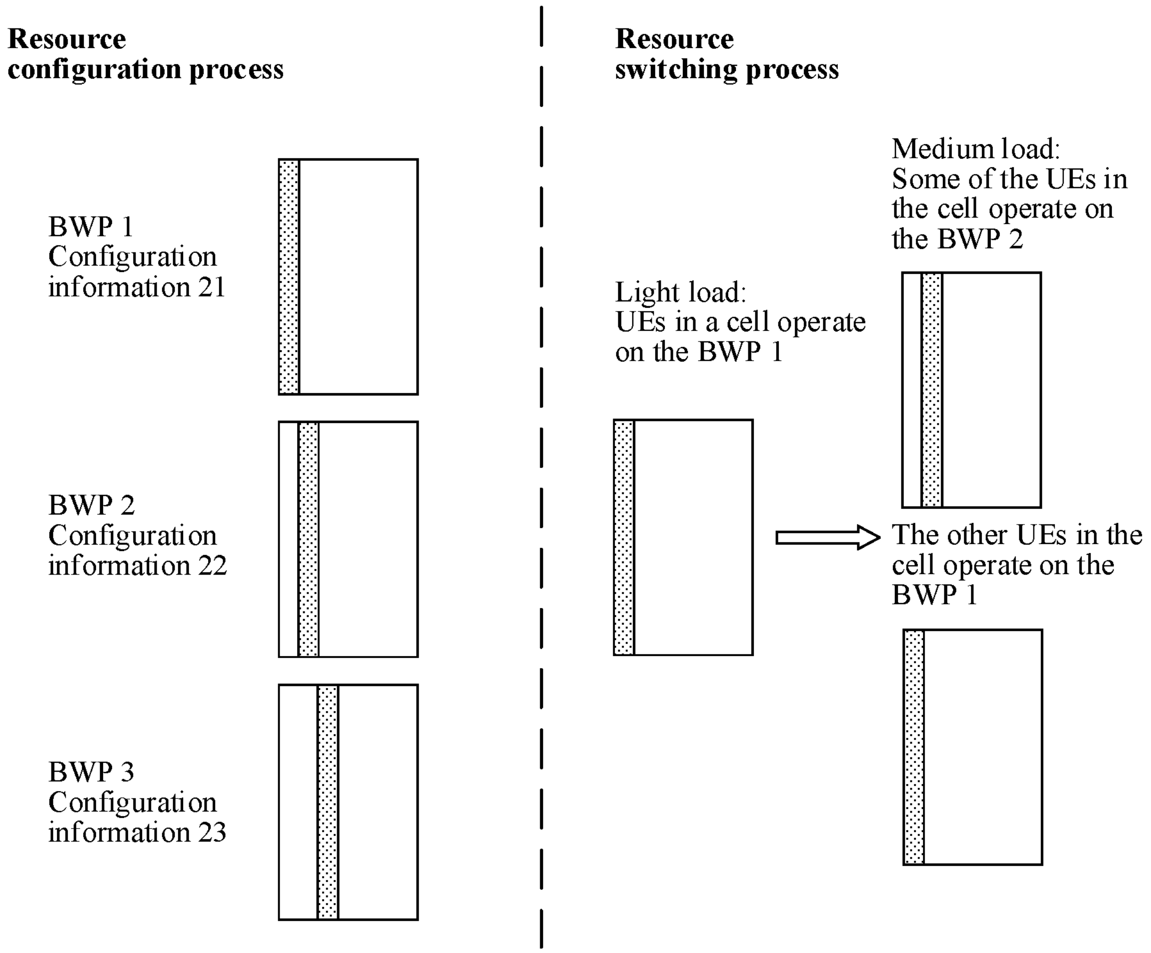
FIG. 7 is a second schematic diagram of configuring and scheduling a PDCCH resource by an access network device according to this application.

Explanations are further provided with reference to a schematic diagram of an example of configuring and scheduling a PDCCH resource by an access network device shown in FIG. 7. FIG. 7 may also be divided into a resource configuration process and a resource switching process.

In the resource configuration process, the access network device may configure, for a UE, configuration information 21, configuration information 22, and configuration information 23 respectively corresponding to a BWP 1, a BWP 2, and a BWP 3.

In the resource configuration process shown in FIG. 7, a time domain resource indicated by the configuration information 21 corresponding to the BWP 1 includes the $1^{st}$ symbol, a time domain resource indicated by the configuration information 22 corresponding to the BWP 2 includes the $2^{nd}$ symbol, and a time domain resource indicated by the configuration information 23 corresponding to the BWP 3 includes the $3^{rd}$ symbol.

In the resource switching process, when a load level of a cell is light load, the access network device schedules the UE in the cell to operate on the BWP 1. Correspondingly, the UE in the cell determines, based on the configuration information 21, the resource for detecting a PDCCH. When the load level of the cell changes from the light load to medium load, the access network device schedules a part of UEs (namely, target UEs) in the cell from the BWP 1 to the BWP 2. Correspondingly, the UE operating on the BWP 2 in the cell determines, based on the configuration information 22, the resource (namely, a first resource) for detecting the PDCCH. A UE still operating on the BWP 1 in the cell may determine, based on the configuration information 21, the resource for detecting the PDCCH.

In the foregoing technical solution, the access network device may configure a plurality of different BWPs for each UE, and each BWP may be independently configured with corresponding PDCCH configuration information. In other words, each BWP may correspond to a quantity of symbols and a frequency domain bandwidth. The access network device may indicate corresponding PDCCH configuration information to the UE in a manner of scheduling the UE to switch the operating BWP. When the cell load changes, the access network device may quickly and efficiently indicate, to the UE, the first BWP information corresponding to changed cell load. This helps the resource for communicating the PDCCH between the access network device and the UE be adapted to the cell load. Further, the first BWP information may be sent by the access network device to the UE by using DCI, and the first BWP information may be for implementing configuration of a TTI granularity.

It should be additionally noted that when the first resource is smaller than the second resource, the access network device may further indicate a resource other than the first resource in the second resource, and the resource may be for communicating the PDSCH between the access network device and the UE.

With reference to the example shown in Table 4, for example, if the access network device schedules the UE to operate on the BWP 2, the UE may determine, based on the configuration information 12, that the first resource includes two symbols (the $1^{st}$ and $2^{nd}$ symbols) in time domain. In this case, the access network device may configure, in the $3^{rd}$ symbol, communication of the PDSCH with the UE, to help improve resource utilization. The PDSCH may be scheduled by using a PDCCH communicated on the $1^{st}$ and $2^{nd}$ symbols.

In a possible manner, the PDCCH carries indication information indicating a location of the PDSCH. The indication information may be rate matching resource pattern (RM pattern) information, or the indication information may be a scheduling start and length indicator value (SLIV).

The following uses an example in which the indication information is the rate matching pattern information for description. The access network device sends in advance, to the UE, a plurality of pieces of rate matching pattern information and rate matching patterns corresponding to the plurality of pieces of rate matching pattern information, where the rate matching pattern information may be an identifier, and the rate matching pattern corresponding to the rate matching pattern information may indicate a pattern relationship between the PDCCH and the PDSCH. It may also be understood that a sub-channel location of the PDCCH indicated by the rate matching pattern may be used as a puncturing location, and a remaining sub-channel location may be for communicating the PDSCH.

For example, the access network device may include, in the first information, the plurality of pieces of rate matching pattern information and the rate matching patterns corresponding to the plurality of pieces of rate matching pattern information, and send the first information to the UE. Alternatively, the access network device may send, to the UE, the plurality of pieces of rate matching pattern information and the rate matching patterns corresponding to the plurality of pieces of rate matching pattern information as a separate message. For example, the separate message may be RRC signaling.

Figure 8:
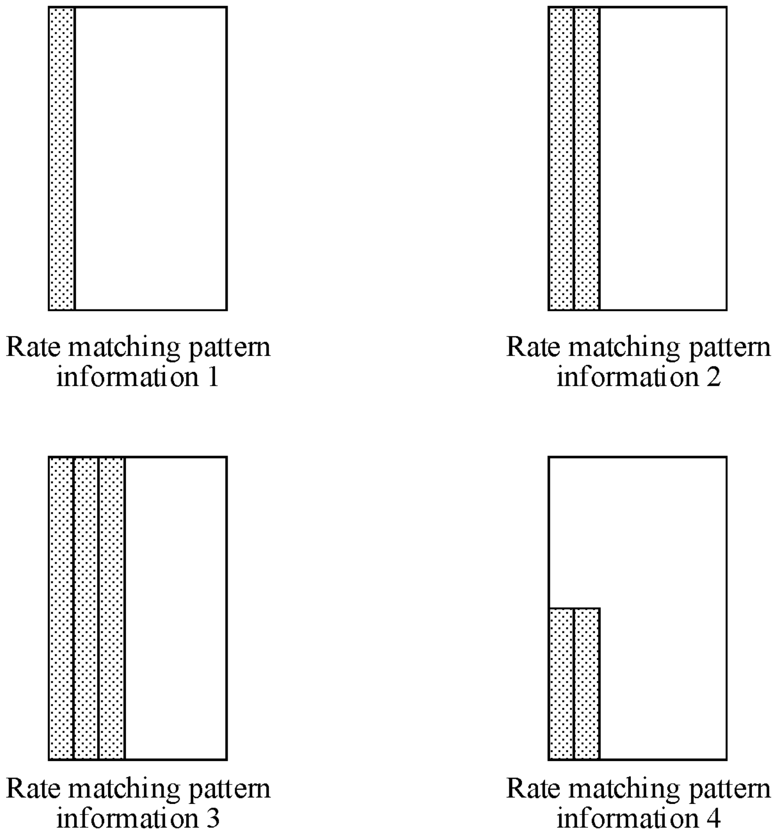
FIG. 8 is a schematic diagram of a group of rate matching patterns according to this application.

When the UE obtains the rate matching pattern information from the PDCCH, the UE may determine, based on the rate matching pattern information, the rate matching pattern corresponding to the rate matching pattern information, and then determine a location of the PDSCH based on the rate matching pattern. FIG. 8 is a schematic diagram of an example of a plurality of rate matching patterns. The schematic diagram includes a rate matching pattern corresponding to rate matching pattern information 1, a rate matching pattern corresponding to rate matching pattern information 2, a rate matching pattern corresponding to rate matching pattern information 3, and a rate matching pattern corresponding to rate matching pattern information 4. For each rate matching pattern shown in FIG. 8, the rate matching pattern may include a shaded area and a non-shaded area, where the shaded area may be for communicating a PDCCH, and the non-shaded area may be for communicating a PDSCH.

For example, if a UE obtains the rate matching pattern information 1 from the PDCCH, the UE may determine, based on the rate matching pattern corresponding to the rate matching pattern information 1, that a start symbol of a time domain resource corresponding to the PDSCH is the $2^{nd}$ symbol and a frequency domain resource corresponding to the PDSCH occupies 20 MHz. For another example, if the UE obtains the rate matching pattern information 4 from the PDCCH, the UE may determine, based on the rate matching pattern corresponding to the rate matching pattern information 4, that the start symbol of the time domain resource corresponding to the PDSCH is the $1^{st}$ symbol and the frequency domain resource occupies 10 MHz, and that for the $3^{rd}$ symbol and the symbols following the $3^{rd}$ symbol of the time domain resource, the corresponding frequency domain resource occupies 20 MHz.

When indicating the rate matching resource pattern information to the UE, the access network device may determine the rate matching resource pattern information with reference to a PDCCH resource corresponding to detection of the PDCCH by the UE in the cell. With reference to the example in Table 4, when the access network device indicates the BWP information 2 to the UE in the cell, all the UEs in the cell operate on the BWP 2. All the UEs in the cell may detect the PDCCH on the $1^{st}$ symbol and the $2^{nd}$ symbol in time domain and on 20 MHz in frequency domain. The access network device may include the rate matching pattern information 2 in the PDCCH, or may include the rate matching pattern information 4 in the PDCCH, so that the UE may determine the location of the PDSCH based on the PDCCH after obtaining the PDCCH through parsing, to parse the PDSCH.

It should be noted that, in the foregoing manner related to Table 5, before indicating the rate matching pattern information to the UE, the access network device may further determine that the UEs in the cell operate on different BWPs. For example, a part of the UEs operate on the BWP 1, in other words, the part of the UEs may detect the PDCCH on the $1^{st}$ symbol in time domain and on 20 MHz in frequency domain. Another part of the UEs operate on the BWP 2, in other words, the part of the UEs may detect the PDCCH on the $2^{nd}$ symbol in time domain and on 20 MHz in frequency domain. The access network device may indicate a same PDSCH resource for the UEs operating on different BWPs, in other words, may indicate the same PDSCH resource by using same rate matching pattern information. For example, the access network device may send the PDCCH to the UEs operating on the BWP 1 in the cell, and the PDCCH may carry the rate matching pattern information 2. Similarly, the access network device may also send the PDCCH to the UEs operating on the BWP 2 in the cell, and the PDCCH may also carry the rate matching pattern information 2. In this way, a conflict between a PDSCH resource determined by the UEs operating on the BWP 1 and a PDCCH resource determined by the UEs operating on the BWP 2 is avoided.

The foregoing provides descriptions merely by using an example in which the first indication information is the first BWP information. When the first indication information is the first detection resource pattern information, the resource information corresponding to the first detection resource pattern information may be a detection resource pattern. In this implementation, the access network device may send configuration information of the second resource to the UE in advance. The configuration information of the second resource may be carried in a separate piece of RRC signaling and sent to the UE, or may be carried in a same piece of RRC signaling with the first information and sent to the UE. When receiving the first detection resource pattern information from the access network device, the UE may determine the detection resource pattern corresponding to the first detection resource pattern information, and then determine the first resource based on the detection resource pattern and the configuration information of the second resource. For details, refer to the descriptions in the foregoing embodiments.

Certainly, the foregoing implementations are only examples for description. The indication information included in the first information and the resource information corresponding to the indication information may alternatively be in another manner. For example, in the resource information indicated by the plurality of pieces of indication information, two pieces of resource information indicate resources of different sizes, and other two pieces of resource information indicate resources of a same size. The access network device may also determine the first indication information (namely, the first BWP information or the first detection resource pattern information) based on the current load information of the cell, and indicate the first indication information to all the UEs or the target UE in the cell.

In addition, this application further provides a communication resource determining method. The method is applicable when the cell load changes, so that a resource for communicating a PDCCH between an access network device and a terminal device is adapted to the cell load. The method may be performed by the terminal device (such as a UE) and the access network device that are shown in FIG. 1 as an example.

In the method, the access network device may determine fourth information in advance, and then configure the fourth information for the UE. The fourth information may include one or more pieces of resource information, the resource information may be configuration information of the PDCCH, and the configuration information of the PDCCH may include a CORESET and SS. When the fourth information includes a plurality of pieces of resource information, resource sizes of a plurality of PDCCH resources respectively indicated by the plurality of pieces of resource information may be the same or different. For example, quantities of symbols included in the plurality of PDCCH resources may be the same or different, and bandwidths of the plurality of PDCCH resources may be the same or different.

In a possible manner, a PDCCH resource indicated by the one or more pieces of resource information included in the fourth information may correspond to one or more of the $1^{st}$ symbol and 20 MHz, the $2^{nd}$ symbol and 20 MHz, the $3^{rd}$ symbol and 20 MHz, the $1^{st}$ and $2^{nd}$ symbols and 20 MHz, the $1^{st}$, $2^{nd}$, and $3^{rd}$ symbols and 20 MHz.

In an example 1, three pieces of resource information included in the fourth information may respectively correspond to the $1^{st}$ symbol and 20 MHz, the $2^{nd}$ symbol and 20 MHz, and the $3^{rd}$ symbol and 20 MHz.

In an example 2, three pieces of resource information included in the fourth information may respectively correspond to the $1^{st}$ symbol and 20 MHz, the $1^{st}$ and $2^{nd}$ symbols and 20 MHz, and the $1^{st}$, $2^{nd}$, and $3^{rd}$ symbols and 20 MHz.

In a possible manner, the access network device may configure the fourth information for the UE via higher layer signaling, where the higher layer signaling is, for example, RRC signaling. For example, the access network device may send an RRC reconfiguration message to the UE, where the RRC reconfiguration message includes the fourth information.

Depending on whether the fourth information includes one piece of resource information or the plurality of pieces of resource information, the following provides descriptions in different cases:

Case a: The fourth information includes the plurality of pieces of resource information.

Before sending the PDCCH to the UE, the access network device may select one piece of resource information from the plurality of pieces of resource information, and then send the PDCCH to the UE on a resource indicated by the selected resource information. Because the UE does not know a specific resource on which the access network device sends the PDCCH, the UE performs, in a full detection manner, detection on the resources respectively indicated by the plurality of pieces of resource information, to determine the resource on which the PDCCH can be detected.

Figure 9:
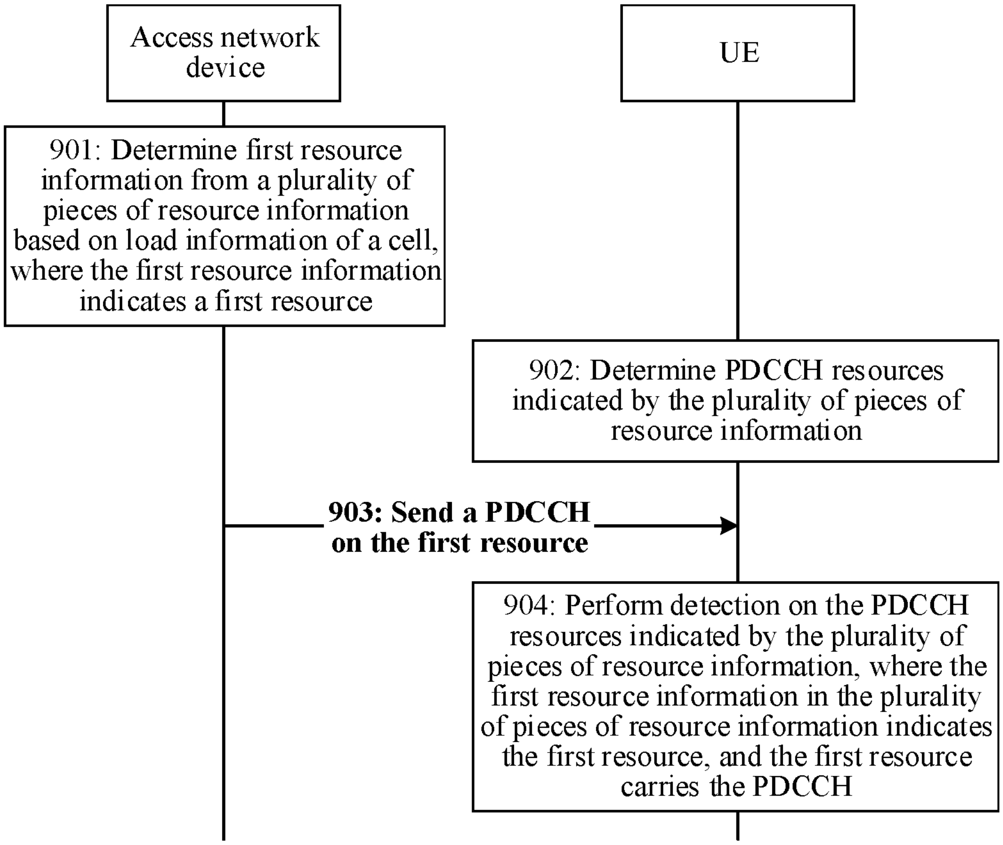
FIG. 9 is a schematic flowchart of another communication resource determining method according to this application.

A procedure of another communication resource determining method shown in FIG. 9 is as follows.

Step 901: An access network device determines first resource information from a plurality of pieces of resource information based on load information of a cell, where the first resource information indicates a first resource.

In a possible implementation, when the access network device determines that a UE accesses the cell, or when the access network device determines that the load information of the cell changes, the access network device may determine the first resource information from the plurality of pieces of resource information based on the load information of the cell, where a size of a PDCCH resource indicated by the first resource information may meet a requirement of the load information of the cell for a size of a PDCCH resource.

Step 902: The UE determines, based on the plurality of pieces of resource information, PDCCH resources respectively indicated by the plurality of pieces of resource information. For example, each of the plurality of pieces of resource information may include a CORESET and SS. The UE may determine, based on the CORESET and the SS included in each piece of resource information, a PDCCH resource indicated by the resource information, so that the UE determines the PDCCH resources respectively indicated by the plurality of pieces of resource information.

Step 903: The access network device sends a PDCCH to the UE on the first resource.

Step 904: The UE performs detection on the PDCCH resources indicated by the plurality of pieces of resource information, where the first resource information in the plurality of pieces of resource information indicates the first resource, and the first resource carries the PDCCH.

A sequence of step 902 and step 901 is not limited in this application.

In the foregoing step 902 to step 904, the UE determines, based on the plurality of pieces of resource information, the PDCCH resources respectively corresponding to the plurality of pieces of resource information, and detects the PDCCH on each PDCCH resource, to determine whether the PDCCH is detected. For example, the plurality of pieces of resource information include resource information 31, resource information 32, and resource information 33. The UE may perform detection on the PDCCH on a resource indicated by the resource information 31, to determine whether the PDCCH is detected; perform detection on the PDCCH on a resource indicated by the resource information 32, to determine whether the PDCCH is detected; and perform detection on the PDCCH on a resource indicated by the resource information 33, to determine whether the PDCCH is detected. For example, the access network device sends the PDCCH to the UE on the resource indicated by the resource information 32. In this case, the UE may detect the PDCCH on the resource indicated by the resource information 32, but detect no PDCCH on the resource indicated by the resource information 31 or on the resource indicated by the resource information 33.

Figure 10:
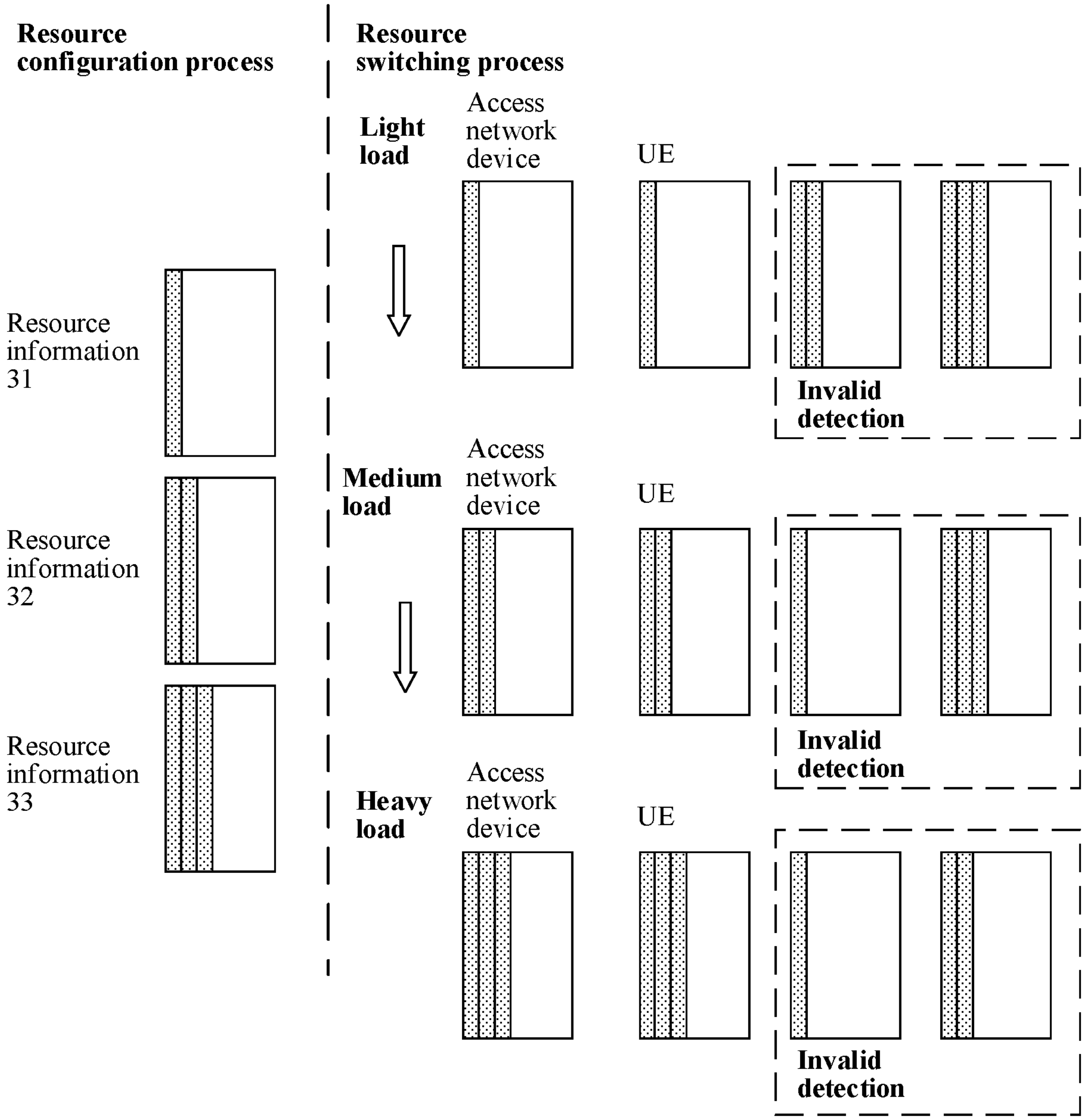
FIG. 10 is a third schematic diagram of configuring and scheduling a PDCCH resource by an access network device according to this application.

Explanations are provided with reference to a schematic diagram of an example of configuring and scheduling a PDCCH resource by an access network device shown in FIG. 10. Fourth information configured by the access network device for a UE includes a plurality of pieces of resource information, and the plurality of pieces of resource information may include resource information 31, resource information 32, and resource information 33. The resource information 31 corresponds to the $1^{st}$ symbol and 20 MHz, the resource information 32 corresponds to the $1^{st}$ and $2^{nd}$ symbols and 20 MHz, and the resource information 33 corresponds to the $1^{st}$, $2^{nd}$, and $3^{rd}$ symbols and 20 MHz. The UE may perform detection on a PDCCH on three different PDCCH resources (that is, the UE performs full detection).

In a light load case, the access network device may send the PDCCH on a resource corresponding to the resource information 31. Although the UE performs full detection, the UE can detect the PDCCH only on the resource corresponding to the resource information 31. Detection performed by the UE on a resource corresponding to the resource information 32 and a resource corresponding to the resource information 33 is an invalid detection.

In a medium load case, the access network device may send the PDCCH on a resource corresponding to the resource information 32. Although the UE performs full detection, the UE can detect the PDCCH only on the resource corresponding to the resource information 32. Detection performed by the UE on a resource corresponding to the resource information 31 and a resource corresponding to the resource information 33 is an invalid detection.

In a heavy load case, the access network device may send the PDCCH on a resource corresponding to the resource information 33. Although the UE performs full detection, the UE can detect the PDCCH only on the resource corresponding to the resource information 33. Detection performed by the UE on a resource corresponding to the resource information 32 and a resource corresponding to the resource information 31 is an invalid detection.

It should be noted that the access network device may alternatively determine a target UE from a cell based on load information of the cell, determine first resource information corresponding to the target UE, and send the PDCCH to the target UE in the cell on a first resource indicated by the first resource information. For the target UE in the cell, the target UE performs full detection on the resources respectively indicated by the plurality of pieces of resource information, and the target UE may detect the PDCCH on the first resource indicated by the first resource information. For a UE other than the target UE in the cell, the access network device may further send the PDCCH to the UE on an original resource. This manner is applicable to a case in which the plurality of pieces of resource information indicate resources of a same size. For example, the plurality of pieces of resource information may include resource information 41, resource information 42, and resource information 43. The resource information 41 corresponds to the $1^{st}$ symbol and 20 MHz, the resource information 42 corresponds to the $2^{nd}$ symbol and 20 MHz, and the resource information 43 corresponds to the $3^{rd}$ symbol and 20 MHz. The UE may perform detection on the PDCCH on three different PDCCH resources (that is, the UE performs full detection).

For example, a load level of the cell is light load. For example, there are 400 UEs in an RRC connected state in the cell. The access network device may send the PDCCH to the 400 UEs in the cell on a resource indicated by the resource information 41. The 400 UEs may detect, through full detection, the PDCCH on the resource indicated by the resource information 41. Then, the access network device determines that the load level of the cell changes from the light load to medium load. For example, if a quantity of UEs in the RRC connected state in the cell increases to 700, the access network device may determine 200 target UEs from the 700 UEs, and then send the PDCCH to the 200 target UEs over a resource indicated by the resource information 42. In this case, the 200 target UEs may detect, through full detection, the PDCCH on the resource indicated by the resource information 42. However, the remaining 500 UEs may still detect, through full detection, the PDCCH on the resource indicated by the resource information 41.

It may be further understood that the fourth information may further indicate a maximum PDCCH resource (namely, a second resource), and the second resource may include a resource indicated by other resource information. With reference to the example shown in FIG. 10, the plurality of pieces of resource information indicated by the fourth information include the resource information 31, the resource information 32, and the resource information 33. The resource information 33 is second resource information. The resource indicated by the resource information 33 may include the resource indicated by the resource information 32, or may include the resource indicated by the resource information 31.

When the first resource is smaller than the second resource, the access network device may further indicate a resource other than the first resource in the second resource, and the resource may be for communicating a PDSCH between the access network device and the UE. In a possible manner, the PDCCH carries indication information indicating a location of the PDSCH. The indication information may be rate matching resource pattern information, or the indication information may be a scheduling start and length indicator value. For details of this implementation, refer to the related descriptions in the embodiment in FIG. 4.

In the foregoing technical solution, the access network device may configure a plurality of pieces of different resource information for the UE. When determining that the load information of the cell changes, the access network device determines the resource information corresponding to the load information of the cell, and then sends the PDCCH to the UE on the resource indicated by the resource information. The UE performs detection on the PDCCH on the resources respectively indicated by the plurality of pieces of different resource information, to determine whether the PDCCH is detected on a resource. In this manner, the access network device does not need to indicate the UE to change a PDCCH resource. This helps ensure that the PDCCH is more flexibly communicated between the access network device and the UE.

Case b: The fourth information includes one piece of resource information.

The resource information may be understood as second resource information, and the second resource information may indicate a maximum PDCCH resource (namely, a second resource). For example, the second resource information may indicate one of the $1^{st}$ symbol and 20 MHz, the $1^{st}$ and $2^{nd}$ symbols and 20 MHz, and the $1^{st}$, $2^{nd}$, and $3^{rd}$ symbols and 20 MHz.

The access network device determines first resource information based on load information of a cell, where the first resource information indicates a first resource, and the first resource is included in the second resource. The UE may perform full detection on the second resource, and then detect the PDCCH in the first resource. The PDCCH may include indication information indicating a location of the PDSCH. The indication information may be rate matching resource pattern information, or the indication information may be a scheduling start and length indicator value. The UE performs detection, based on the indication information, on a PDSCH on a resource indicated by the indication information.

Figure 11:
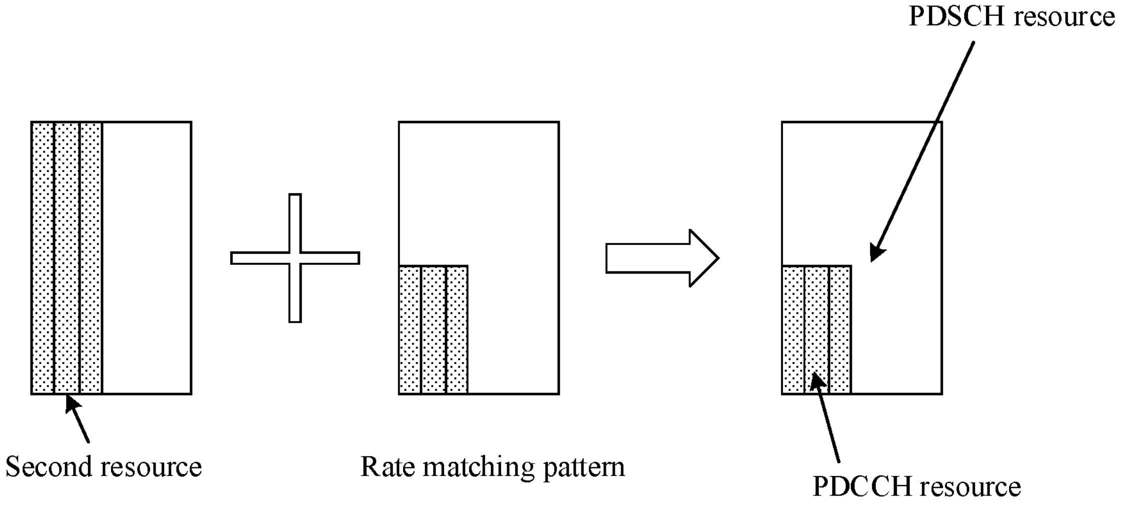
FIG. 11 is a fourth schematic diagram of configuring and scheduling a PDCCH resource by an access network device according to this application.

For example, with reference to FIG. 11, the second resource indicated by the second resource information corresponds to the $1^{st}$, $2^{nd}$, and $3^{rd}$ symbols and 20 MHz, and the access network device sends the PDCCH to the UE on the $1^{st}$, $2^{nd}$, and $3^{rd}$ symbols and on 10 MHz. The PDCCH may include rate matching pattern information, and the rate matching pattern information may indicate a rate matching pattern shown in FIG. 11. The UE performs full detection on the PDCCH on the $1^{st}$, $2^{nd}$, and $3^{rd}$ symbols and on 20 MHz, and then detects the PDCCH, where the PDCCH may include the rate matching pattern information. The UE determines the location of the PDSCH based on the rate matching pattern indicated by the rate matching pattern information and the second resource, and parses the PDSCH at the location. Refer to a block on the right side of an arrow shown in FIG. 11. A shaded area indicates a PDCCH resource, a non-shaded area indicates a PDSCH resource, and the UE may receive the PDSCH on the PDSCH resource indicated by the non-shaded area.

In the foregoing technical solution, the access network device may configure the maximum PDCCH resource (namely, the second resource) for the UE. When determining that the load information of the cell changes, the access network device determines the first resource corresponding to the load information of the cell, and then sends the PDCCH to the UE on the first resource. The UE detects the PDCCH on the second resource, and the access network device does not need to indicate the UE to change a PDCCH resource. This helps ensure that the PDCCH is more flexibly communicated between the access network device and the UE. Further, the access network device includes, in the PDCCH, the indication information indicating the PDSCH resource. This helps improve resource utilization.

Figure 12:
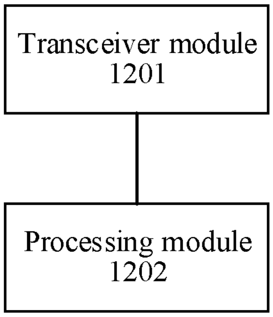
FIG. 12 is a schematic diagram of a communication apparatus according to this application.
Figure 13:
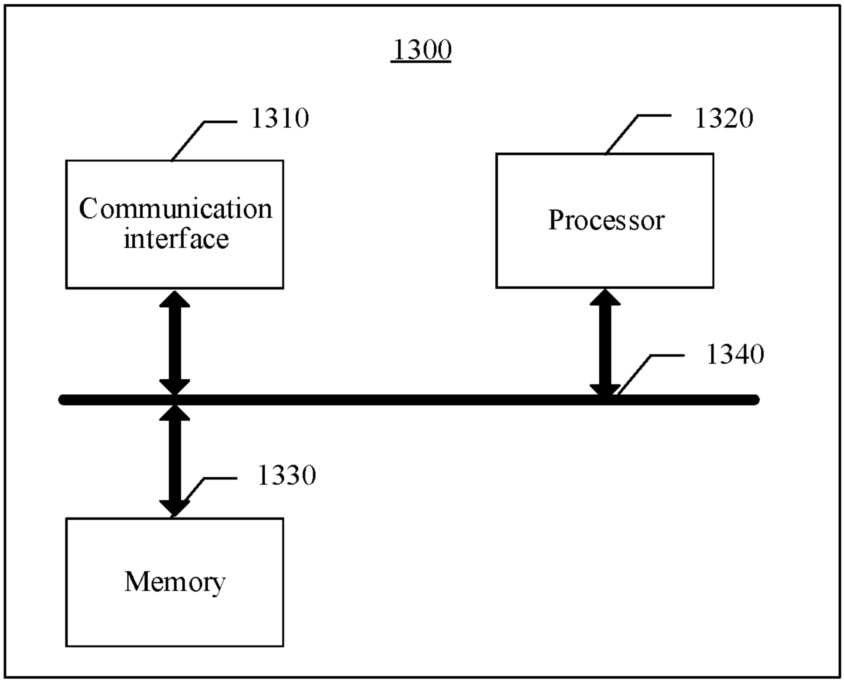
FIG. 13 is a schematic diagram of a structure of another communication apparatus according to this application.

Based on the foregoing content and a same concept, FIG. 12 and FIG. 13 are schematic diagrams of structures of possible communication apparatuses according to this application. These communication apparatuses may be configured to implement functions of the terminal device or the access network device in the foregoing method embodiments. Therefore, beneficial effects of the foregoing method embodiments can also be achieved.

In this application, the communication apparatus may be the terminal device shown in FIG. 1, or may be the access network device shown in FIG. 1, or may be a module (for example, a chip) used in the terminal device or the access network device.

As shown in FIG. 12, the communication apparatus 1200 includes a transceiver module 1201 and a processing module 1202.

In a possible implementation, the communication apparatus 1200 is configured to implement functions of the terminal device in the method embodiment shown in FIG. 4, or is configured to implement functions of the access network device in the method embodiment shown in FIG. 4.

When the communication apparatus 1200 is configured to implement the function of the terminal device in the method embodiment shown in FIG. 4, the transceiver module 1201 is configured to receive first indication information from an access network device, where the first indication information is associated with load information of a cell to which the apparatus 1200 belongs; and the processing module 1202 is configured to determine, based on the first indication information and first information, a first resource for detecting detect a physical downlink control channel, where the first information includes a plurality of pieces of resource information, the first indication information corresponds to first resource information in the plurality of pieces of resource information, and the first resource information indicates the first resource.

In a possible implementation, the first information further includes a plurality of pieces of indication information, the plurality of pieces of indication information respectively correspond to the plurality of pieces of resource information, and the plurality of pieces of indication information include the first indication information.

In a possible implementation, at least one of the following indicated by different resource information in the first information is different: a quantity of symbols or a bandwidth of resources used by the apparatus 1200 to detect the physical downlink control channel.

In a possible implementation, the indication information in the first information is bandwidth part information, the first indication information is first bandwidth part information, and the first bandwidth part information further indicates for the apparatus 1200 to switch an operating bandwidth to a bandwidth part corresponding to the first bandwidth part information.

In a possible implementation, the plurality of pieces of resource information further include second resource information, the second resource information indicates a second resource, and the second resource includes the first resource.

In a possible implementation, a resource other than the first resource in the second resource is used by the apparatus 1200 to receive a physical downlink shared channel. In a possible implementation, a location of the physical downlink shared channel is indicated by rate matching pattern information on the physical downlink control channel.

In a possible implementation, the transceiver module 1201 is further configured to receive the first information from the access network device via RRC signaling.

When the communication apparatus 1200 is configured to implement the function of the access network device in the method embodiment shown in FIG. 4, the transceiver module 1201 is configured to send first indication information to a terminal device, where the first indication information is associated with load information of a cell of the apparatus 1200; and the processing module 1202 is configured to determine, based on the first indication information and first information, a first resource used by the apparatus 1200 to send a physical downlink control channel, where the first information includes a plurality of pieces of resource information, the first indication information corresponds to first resource information in the plurality of pieces of resource information, and the first resource information indicates the first resource.

In a possible implementation, the first information further includes a plurality of pieces of indication information, the plurality of pieces of indication information respectively correspond to the plurality of pieces of resource information, and the plurality of pieces of indication information include the first indication information.

In a possible implementation, at least one of the following indicated by different resource information in the first information is different: a quantity of symbols or a bandwidth of resources used by the apparatus 1200 to send the physical downlink control channel.

In a possible implementation, the first indication information is first bandwidth part information, and the first bandwidth part information is further used by the apparatus 1200 to schedule an operating bandwidth of the terminal device to be switched to a bandwidth part corresponding to the first bandwidth part information.

In a possible implementation, the plurality of pieces of resource information further include second resource information, the second resource information indicates a second resource, and the second resource includes the first resource.

In a possible implementation, a resource other than the first resource in the second resource is used by the apparatus 1200 to send a physical downlink shared channel. In a possible implementation, a location of the physical downlink shared channel is indicated by rate matching pattern information on the physical downlink control channel.

In a possible implementation, the processing module 1202 is further configured to determine the first indication information based on the load information of the cell and the first information.

In a possible implementation, the processing module 1202 is further configured to select, according to a preset policy, the terminal device from terminal devices served by the cell. In a possible implementation, the transceiver module 1201 is further configured to send the first information to the terminal device via RRC signaling.

In a possible implementation, the communication apparatus 1200 is configured to implement functions of the terminal device in the method embodiment shown in FIG. 9, or is configured to implement functions of the access network device in the method embodiment shown in FIG. 9.

When the communication apparatus 1200 is configured to implement the function of the terminal device in the method embodiment shown in FIG. 9, the processing module 1202 is configured to determine resources indicated by a plurality of pieces of resource information; and the transceiver module 1201 is configured to perform detection on the resources indicated by the plurality of pieces of resource information, where first resource information in the plurality of pieces of resource information indicates a first resource, the first resource carries a physical downlink control channel, and the first resource information is associated with load information of a cell to which the apparatus 1200 belongs.

In a possible implementation, sizes of resources used by the apparatus 1200 to detect the physical downlink control channel and indicated by different resource information in the plurality of pieces of resource information are different. For example, at least one of quantities of symbols or bandwidths of resources used by the transceiver module 1201 to detect the physical downlink control channel and indicated by different resource information in the plurality of pieces of resource information are different.

In a possible implementation, the plurality of pieces of resource information further include second resource information, the second resource information indicates a second resource, and the second resource includes the first resource. In a possible implementation, a resource other than the first resource in the second resource is used by the transceiver module 1201 to receive a physical downlink shared channel. In a possible implementation, a location of the physical downlink shared channel is indicated by rate matching pattern information on the physical downlink control channel.

In a possible implementation, the transceiver module 1201 is further configured to receive the plurality of pieces of resource information from the access network device via RRC signaling.

In a possible implementation, when performing detection on the resources indicated by the plurality of pieces of resource information, the transceiver module 1201 is configured to: perform detection on a resource indicated by each piece of resource information, and determine whether the physical downlink control channel from the access network device is received.

When the communication apparatus 1200 is configured to implement the function of the access network device in the method embodiment shown in FIG. 9, the processing module 1202 is configured to determine first resource information from a plurality of pieces of resource information, where the first resource information is associated with load information of a cell of the apparatus 1200, and the first resource information in the plurality of pieces of resource information indicates a first resource; and the transceiver module 1201 is configured to send a physical downlink control channel to a terminal device on the first resource.

In a possible implementation, sizes of resources used by the apparatus 1200 to send the physical downlink control channel and indicated by different resource information in the plurality of pieces of resource information are different.

For example, at least one of quantities of symbols or bandwidths of resources used by the apparatus 1200 to send the physical downlink control channel and indicated by different resource information in the plurality of pieces of resource information are different.

In a possible implementation, the plurality of pieces of resource information further include second resource information, the second resource information indicates a second resource, and the second resource includes the first resource. In a possible implementation, a resource other than the first resource in the second resource is used by the apparatus 1200 to send a physical downlink shared channel. In a possible implementation, a location of the physical downlink shared channel is indicated by rate matching pattern information on the physical downlink control channel.

In a possible implementation, the transceiver module 1201 is further configured to send the plurality of pieces of resource information to the terminal device via RRC signaling.

In a possible implementation, when determining first resource information from a plurality of pieces of resource information, the processing module 1202 is configured to determine the first resource information from the plurality of pieces of resource information based on the load information of the cell.

FIG. 13 shows an apparatus 1300 according to some embodiments of this application. The apparatus shown in FIG. 13 may be an implementation of a hardware circuit of the apparatus shown in FIG. 12. The apparatus is applicable to the foregoing flowcharts, and performs the function of the terminal device or the access network device in the foregoing method embodiments.

For ease of description, FIG. 13 shows only main components of the apparatus.

The apparatus 1300 shown in FIG. 13 includes a communication interface 1310, a processor 1320, and a memory 1330. The memory 1330 is configured to store program instructions and/or data. The processor 1320 may cooperate with the memory 1330. The processor 1320 may execute the program instructions stored in the memory 1330. When instructions or a program stored in the memory 1330 are/is executed, the processor 1320 is configured to perform an operation performed by the processing module 1202 in FIG. 12, and the communication interface 1310 is configured to perform an operation performed by the transceiver module 1201 in FIG. 12.

The memory 1330 is coupled to the processor 1320. The coupling in some embodiment of this application is an indirect coupling or a communication connection between apparatuses, units, or modules in an electrical form, a mechanical form, or another form, and is used for information exchange between the apparatuses, the units, or the modules. At least one memory 1330 may be included in the processor 1320.

In some embodiments of this application, the communication interface may be a transceiver, a circuit, a bus, a module, or a communication interface of another type. In some embodiments of this application, when the communication interface is the transceiver, the transceiver may include an independent receiver and an independent transmitter, or may be a transceiver integrated with a transceiver function or a communication interface.

The apparatus 1300 may further include a communication line 1340. The communication interface 1310, the processor 1320, and the memory 1330 may be connected to each other through the communication line 1340. The communication line 1340 may be a peripheral component interconnect (PCI) bus, an extended industry standard architecture (EISA) bus, or the like. The communication line 1340 may be classified into an address bus, a data bus, a control bus, and the like. For ease of description, the bus in FIG. 13 is represented by using only one bold line. However, this does not represent that there is only one bus or one type of bus.

Based on the foregoing content and a same concept, some embodiments of this application provides a computer-readable storage medium. The computer-readable storage medium stores a computer program or instructions. When the computer program or the instructions are executed, a computer is enabled to perform the method in the foregoing method embodiments.

Based on the foregoing content and a same concept, some embodiments of this application provides a computer program product. When a computer reads and executes the computer program product, the computer is enabled to perform the method in the foregoing method embodiments.

Based on the foregoing content and a same concept, some embodiments of this application provides a communication system. The communication system includes an access network device and at least one terminal device. The terminal device may have a function of the terminal device in the foregoing method embodiments, and the access network device may have a function of the access network device in the foregoing method embodiments.

It may be understood that numbers in embodiments of this application are only used for differentiation and for ease of description. They are not used to limit the scope of the embodiments of this application. Sequence numbers of the foregoing processes are not execution sequences, and the execution sequences of the processes should be determined based on functions and internal logic of the processes.

A person skilled in the art could make various modifications and variations to this application without departing from the scope of this application. This application is intended to cover those modifications and variations of this application, provided that they fall within the scope of protection defined by the claims and their equivalent technologies.

What is claimed:

1. A communication resource determining method, comprising:

receiving, by a terminal device, first indication information, wherein the first indication information is associated with load information of a cell to which the terminal device belongs; and determining, by the terminal device based on the first indication information and first information, a first resource for detecting a physical downlink control channel, wherein the first information comprises a plurality of pieces of resource information, the first indication information corresponds to first resource information in the plurality of pieces of resource information, and the first resource information indicates the first resource, wherein the plurality of pieces of resource information comprise second resource information, the second resource information indicates a second resource, the second resource comprises the first resource, and wherein a resource other than the first resource in the second resource is used by the terminal device to receive a physical downlink shared channel, and a location of the physical downlink shared channel is indicated by rate matching pattern information on the physical downlink control channel.

2. The method according to claim 1, wherein sizes of at least two resources indicated by different resource information in the plurality of pieces of resource information are different.

3. The method according to claim 1, wherein the first indication information is first bandwidth part information, and the first bandwidth part information indicates for the terminal device to switch an operating bandwidth to a bandwidth part corresponding to the first bandwidth part information.

4. The method according to claim 1, further comprising: receiving, by the terminal device, the first information from an access network device via radio resource control signaling.

5. A communication resource determining method, comprising:

sending, by an access network device, first indication information, wherein the first indication information is associated with load information of a cell of the access network device; and determining, by the access network device based on the first indication information and first information, a first resource used by the access network device to send a physical downlink control channel, wherein the first information comprises a plurality of pieces of resource information, the first indication information corresponds to first resource information in the plurality of pieces of resource information, and the first resource information indicates the first resource, wherein the plurality of pieces of resource information comprise second resource information, the second resource information indicates a second resource, and the second resource comprises the first resource; and a resource other than the first resource in the second resource is used by the access network device to send a physical downlink shared channel, and a location of the physical downlink shared channel is indicated by rate matching pattern information on the physical downlink control channel.

6. The method according to claim 5, wherein sizes of at least two resources indicated by different resource information in the plurality of pieces of resource information are different.

7. The method according to claim 5, wherein the first indication information is first bandwidth part information, and the first bandwidth part information is used by the access network device to schedule an operating bandwidth of a terminal device to be switched to a bandwidth part corresponding to the first bandwidth part information.

8. The method according to claim 5, further comprising: determining, by the access network device based on the load information of the cell and the first information, the first indication information.

9. The method according to claim 5, further comprising: selecting, by the access network device according to a preset policy, a terminal device from terminal devices served by the cell.

10. The method according to claim 5, further comprising: sending, by the access network device, the first information to a terminal device via radio resource control signaling.

11. An apparatus, comprising:

a processor and a memory, wherein the memory is configured to store a computer program, and the processor is configured to invoke and run the computer program stored in the memory, wherein the computer program instructs the processor to:

receive first indication information, wherein the first indication information is associated with load information of a cell to which the apparatus belongs; and determine, based on the first indication information and first information, a first resource for detecting a physical downlink control channel, wherein the first information comprises a plurality of pieces of resource information, the first indication information corresponds to first resource information in the plurality of pieces of resource information, and the first resource information indicates the first resource, wherein the plurality of pieces of resource information comprise second resource information, the second resource information indicates a second resource, and the second resource comprises the first resource; and a resource other than the first resource in the second resource is used by the apparatus to receive a physical downlink shared channel, and a location of the physical downlink shared channel is indicated by rate matching pattern information on the physical downlink control channel.

12. The apparatus according to claim 11, wherein sizes of at least two resources indicated by different resource information in the plurality of pieces of resource information are different.

13. The apparatus according to claim 11, wherein the first indication information is first bandwidth part information, and the first bandwidth part information indicates for the apparatus to switch an operating bandwidth to a bandwidth part corresponding to the first bandwidth part information.

14. The apparatus according to claim 11, wherein the computer program further instructs the processor to:

receive the first information from an access network device via radio resource control signaling.

15. The method according to claim 1, wherein the first indication information is one of a plurality of pieces of indication information, and the plurality of pieces of indication information respectively correspond to the plurality of pieces of resource information.

16. The method according to claim 5, wherein the first indication information is one of a plurality of pieces of indication information, and the plurality of pieces of indication information respectively correspond to the plurality of pieces of resource information.

17. The apparatus according to claim 11, wherein the first indication information is one of a plurality of pieces of indication information, and the plurality of pieces of indication information respectively correspond to the plurality of pieces of resource information.

* * * * *